(12) United States Patent
Kaehler et al.

(10) Patent No.: US 12,172,317 B2
(45) Date of Patent: Dec. 24, 2024

(54) ARTIFICIAL INTELLIGENCE-ACTUATED ROBOT

(71) Applicant: Sanctuary Cognitive Systems Corporation, Vancouver (CA)

(72) Inventors: Adrian L. Kaehler, Boulder Creek, CA (US); Christopher M. Cianci, San Jose, CA (US); Kyle J. Martin, Glendale, CA (US); Carolyn Wales, Menlo Park, CA (US); Jeffrey S. Kranski, Portland, OR (US)

(73) Assignee: Sanctuary Cognitive Systems Corporation, Vancouver (CA)

( * ) Notice: Subject to any disclaimer, the term of this patent is extended or adjusted under 35 U.S.C. 154(b) by 0 days.

(21) Appl. No.: 18/244,916

(22) Filed: Sep. 12, 2023

(65) Prior Publication Data

US 2023/0415340 A1 Dec. 28, 2023

Related U.S. Application Data

(60) Division of application No. 16/918,999, filed on Jul. 1, 2020, now Pat. No. 11,787,050, which is a
(Continued)

(51) Int. Cl.
*B25J 9/16* (2006.01)
*B25J 9/06* (2006.01)
(Continued)

(52) U.S. Cl.
CPC ............... *B25J 9/1664* (2013.01); *B25J 9/06* (2013.01); *B25J 9/1075* (2013.01); *B25J 9/126* (2013.01);
(Continued)

(58) Field of Classification Search
CPC ... B25J 9/06; B25J 9/1075; B25J 9/126; B25J 9/161; B25J 9/1664; B25J 13/085;
(Continued)

(56) References Cited

U.S. PATENT DOCUMENTS

| | | | | |
|---|---|---|---|---|
| 5,555,347 A | * | 9/1996 | Yoneda | B25J 9/1607 706/903 |
| 2004/0015933 A1 | * | 1/2004 | Campos | G05B 19/404 717/160 |

(Continued)

*Primary Examiner* — Dale Moyer
(74) *Attorney, Agent, or Firm* — Thomas Mahon; Adenike Adebiyi

(57) ABSTRACT

A robot is provided having a kinematic chain comprising a plurality of joints and links, including a root joint connected to a robot pedestal, and at least one end effector. A plurality of actuators are fixedly mounted on the robot pedestal. A plurality of tendons is connected to a corresponding plurality of actuation points on the kinematic chain and to actuators in the plurality of actuators, arranged to translate actuator position and force to actuation points for tendon-driven joints on the kinematic chain with losses in precision due to variability of tendons in the plurality of tendons. A controller operates the kinematic chain to perform a task. The controller is configured to generate actuator command data in dependence on the actuator states and image data in a manner that compensates for the losses in precision in the tendon-driven mechanisms.

15 Claims, 22 Drawing Sheets

Related U.S. Application Data continuation-in-part of application No. PCT/US2019/068204, filed on Dec. 22, 2019, which is a continuation-in-part of application No. 16/237,721, filed on Jan. 1, 2019, now Pat. No. 11,312,012.

(60) Provisional application No. 62/854,071, filed on May 29, 2019.

(51) Int. Cl.
| | |
|---|---|
| *B25J 9/10* | (2006.01) |
| *B25J 9/12* | (2006.01) |
| *B25J 13/08* | (2006.01) |
| *B25J 15/10* | (2006.01) |

(52) U.S. Cl.
CPC ............ *B25J 9/161* (2013.01); *B25J 13/085* (2013.01); *B25J 13/089* (2013.01); *B25J 15/10* (2013.01)

(58) Field of Classification Search
CPC ... B25J 13/089; B25J 15/10; G05B 2219/027; G05B 2219/41046; G05B 2219/41054
See application file for complete search history.

(56) References Cited

U.S. PATENT DOCUMENTS

| | | | |
|---|---|---|---|
| 2017/0106542 A1* | 4/2017 | Wolf | ............... B25J 9/0081 |
| 2017/0252922 A1* | 9/2017 | Levine | ............... G06N 3/084 |

* cited by examiner

Joints 300B

1200

ARTIFICIAL INTELLIGENCE-ACTUATED ROBOT

CROSS-REFERENCE TO RELATED APPLICATIONS

This application is a division of U.S. patent application Ser. No. 16/918,999 filed on Jul. 1, 2020, which is a continuation-in-part of International Application No. PCT/US2019/068204 filed on Dec. 22, 2019, which claims the benefit of U.S. Provisional Application 62/854,071 filed on May 29, 2019 and is a continuation-in-part of U.S. patent application Ser. No. 16/237,721 filed on Jan. 1, 2019. The disclosures of these related applications are incorporated herein by reference.

FIELD

The technology disclosed relates to actuating robots using artificial intelligence, and including actuating robots having tendon-driven joints using artificial intelligence.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Some robots comprise kinematic chains of joints and links with actuators to move the robot. Actuators translate power into motion of a joint or link on a robot. An actuator on a robot can comprise an electrical motor with associated gears and links having substantial mass. Often actuators are integrated within the mechanical structure of a robot near the joints or links to be moved. The mass of integrated actuators works against the low inertia and fast response desired in high-performance robotic applications.

Integrated actuators are arranged in a kinematic chain that progresses downstream. For example, along an arm of a humanoid robot, the shoulder actuator actuates the elbow actuator, the elbow actuator actuates the forearm actuator, the forearm actuator actuates the wrist actuator, and the wrist actuator actuates the hand actuator. At the wrist, the kinematic chain branches into fingers, which can consist of several links and joints with corresponding actuators that provide dexterity within a small volume corresponding to the reach of the fingers. In the kinematic chain, a preceding actuator is larger, more powerful, more precise, and more expensive than a succeeding actuator, thereby making the actuator for the root joint of the chain, or for joints near the root joint, in many cases, the largest, most powerful, most precise, and costliest actuator in the robot. Humanoid robots may have multiple such large actuators, making them prohibitively expensive, bulky, dangerous, and energy inefficient. Furthermore, even with precise actuators along the root of the chain, as the kinematic chain extends across many links and joints, the precision of control of dexterous end effectors is limited.

Tendon-driven mechanisms (TDMs) or tendon transmission systems are used to separate the actuators from the robot links. This separation of the bulky actuators from the joints decreases the link size, mass, and inertia of the joints, supporting more dexterity. However, variability of tendons introduces imprecision in the actuation of the robot, as they can change in length and elasticity due to changes in environmental conditions and due to wear-and-tear. This imprecision can increase with the length of the tendon and can vary with the types of materials used for the tendons. This imprecision includes include slack, dead band, and backlash hysteresis. Such imprecision causes inaccuracy in the translation of actuator motion to the robot. Therefore, even with tendon driven joints separated from their actuators, as the kinematic chain extends across many links and joints, the precision of control of dexterous end effectors remains limited.

It is desirable to provide technology that can reduce the cost of robots while managing for imprecision inherent in the structure.

SUMMARY

A technology is described that can improve the mass distribution in robots, including but not limited to humanoid robots, by positioning the actuators distant from their corresponding joints along the kinematic chain, and while compensating for imprecision in the structure. Improved robot inertia, dexterity, operation safety, and energy savings may result. Reduced operating cost may also result.

A robot is described including a robot structural frame, and a kinematic chain including a root joint connected to the structure frame. The kinematic chain comprises a plurality of joints and links arranged downstream from the root joint, and at least one end effector. The robot includes a plurality of actuators, wherein the actuators in the plurality of actuators produce actuator data indicating current actuator states, and respond to actuator command data to drive the actuators. A plurality of tendons connect to a corresponding plurality of actuation points on the kinematic chain and to actuators in the plurality of actuators, arranged to translate actuator position and force to actuation points on the kinematic chain. Using tendon driven joints, actuators in the plurality of actuators are positioned on the structural frame or on the kinematic chain upstream from the actuation points to which they are connected. The robot includes a sensor, or more preferably a plurality of sensors, configured to generate sensor data indicating in three dimensions a position of the at least one end effector and of an object subject of a task. In some embodiments, a plurality of sensors are utilized mounted on one or more branches of the kinematic chain, and configured to generate information simultaneously from multiple points of view, indicating orientation and position in three dimensions and in time, of an object of a task and of the at least one end effector.

A controller in communication with the plurality of actuators and the sensor or sensors to operate the kinematic chain includes a trained neural network in a feedback loop receiving feedback data as input derived from or including the actuator data and the sensor data.

The trained neural network is trained to generate actuator command data to cause the robot to execute a task to manipulate the object in response to the feedback data, including controlling actuators for a branch of the kinematic chain including a sensor or sensors in the plurality of sensors, and actuators for a branch or branches of the kinematic chain including the at least one end effector. In some embodiments, the controller generates an output command set for a current time interval in response to feedback data that indicates results of driving the robot with the immediately preceding command set, providing real time control. The controller can generate actuator data to drive actuators for tendon driven elements on the sensor branch to control the orientation and position of the sensor, thereby changing the point of view represented by the feedback data in real time, while causing the robot to execute the task. With a feedback control loop using a neural network, the controller compensates for imprecision of the components of the robot, including the tendon driven joints. The enables utilization of tendon drive joints for which the actuators are mounted two or more links upstream on the kinematic chain from the actuated joints. In one architecture described herein, all the actuators are mounted on a structural frame, referred to in examples described herein as the pedestal, upstream from the root joint of the kinematic chain.

A location upstream of an element of a kinematic chain is a location that is not necessarily moved by movement of the element, such as a wrist is not necessarily moved by actuation of a finger and is therefore upstream of the finger. A location downstream of an element of a kinematic chain is a location that is necessarily moved by movement of the element, such as a finger is necessarily moved by movement of a wrist and is therefore downstream of the wrist.

The robot can include at least one end effector that comprises an end effector root joint on the kinematic chain, and a combination of links and joints downstream from the end effector root joint configured for grasping an object. Embodiments are described wherein the plurality of tendons includes tendons connected to actuation points on the at least one end effector, and the actuators coupled to tendons connected to the actuation points on the end effector are positioned upstream from the end effector root joint. The actuators for the tendon-actuated, end effector joints can be positioned two or more joints upstream of the end effector root joint, and in some embodiments upstream of the root joint of the kinematic chain on the structural frame.

A robot is provided having a kinematic chain comprising a plurality of joints and links, including a root joint connected to a structural frame such as the structure referred to herein as a robot pedestal, and at least one end effector. A plurality of actuators are fixedly mounted on the robot pedestal in one example in which there may be no actuators downstream of the root joint of the chain, and as a consequence all or a large number of the joints on the kinematic chain are tendon driven and there are a large number of tendons amplifying the imprecision of the data provided from the actuators that indicate the position of the joints. The actuators in the plurality of actuators produce data indicating current actuator states, and respond to actuator command data to adjust actuator states. A plurality of tendons is connected to a corresponding plurality of actuation points on the kinematic chain and to actuators in the plurality of actuators, arranged to translate actuator position and force to actuation points for tendon-driven joints, or other tendon-driven mechanisms, on the kinematic chain with losses in precision due to variability of tendons in the plurality of tendons. Also, implementations are disclosed in which tendons for tendon driven mechanisms at or near end effectors extend along the kinematic chain to actuators that are off the kinematic chain.

A controller is described arranged to be in communication with the plurality of actuators operates the kinematic chain to perform a task. The controller is configured to generate actuator command data in dependence on the actuator states. In implementations described herein, the controller includes processing resources which compensate for the losses in precision in the tendon-driven mechanisms distributed on the kinematic chain, in performance of the task. The processing resources of the controller include a trained neural network, or a configuration of trained neural networks.

A robot is provided that comprises tendon-driven elements, with a controller comprising a neural network in a feedback control loop, the neural network trained to generate sequences of actuator commands that cause the robot to execute a task. The system provides feedback data applied to generate a next set of actuator command, which reflects the effects of a previous set of actuator commands to the control loop. In one example system capable of precise control of the robot, for each cycle that produces a next set of actuator commands, the feedback data includes actuator state data for actuators of tendon driven joints (including in some embodiments for over 20 or over 30 tendon-driven joints), images of an operating field including an object subject of the task and the end effectors of the robot from at least two points of view, and range data for the operating field including the object from at least two points of view. As described below, the image sensors and range sensors in some embodiments are disposed on the kinematic chain of the robot, and are positioned under the control of the feedback loop to adjust the fields of view for the image data to be gathered for a next cycle. The actuator state data can include information about a current angle of rotation, and in addition a current count of complete rotations for each cycle. In some embodiments, the feedback data for each cycle includes additional sensor data from sensors on the kinematic chain, including one or more of pressure sensors, proximity sensors, and joint rotation and force sensors.

A method for operating a robot such as described above is provided. In an implementation disclosed, the method comprises reading actuator state information from actuators configured to actuate tendons of the plurality of tendon-driven joints; reading sensor data configured to generate data representing in three dimensions, an object and the at least one end effector, in a field of view; and generating actuator command data in dependence on the actuator state information and images to operate the plurality of tendon-driven joints in the kinematic chain to perform a task, including compensating for imprecision of the tendons of the plurality of tendon-driven joints. In some embodiments, the actuator command data is generated in dependence on additional sensor data, such as touch sense data, pressure data, proximity detection data, joint force data and on various combinations of additional sensor data.

A method for operating a robot is described suitable for controlling a robot including a kinematic chain having a root joint and a plurality of tendon-driven joints and links, including at least one end effector, and a plurality of actuators coupled to tendons for the plurality of tendon-driven joints and links. The method comprises reading actuator data from actuators configured to actuate tendons of the plurality of tendon-driven joints, and generating sensor data indicating in three dimensions and in time, a position of the at least one end effector and of an object. Using the actuator data and the sensor information, the method includes driving the plurality of actuators by providing feedback data as input to a trained neural network, the feedback data derived from or including the actuator data and the sensor data, the trained neural network being trained to generate actuator command data to cause the robot to execute a task to manipulate the object in response to the feedback data.

Also, technology is disclosed for implementing tendon-driven mechanisms using coupler technology that can reduce or compensate for imprecision of tendons, including tendons extending from a substrate off the kinematic chain to actuation points at the end effectors on the robot. Also, technology is disclosed utilizing sensors on the actuators to provide actuator sensor data as an addition to the feedback data used by the controller.

Other aspects and advantages of the technology described herein can be seen in the drawings, the detailed description and the claims provided below.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

The following description will typically be with reference to specific structural implementations and methods. It is to be understood that there is no intention to limit the technology to the specifically disclosed implementations and methods but that the technology may be practiced using other features, elements, methods and implementations. Preferred implementations are described to illustrate the present technology, not to limit its scope, which is defined by the claims. Those of ordinary skill in the art will recognize a variety of equivalent variations on the description that follows.

Robot

Figure 1A:
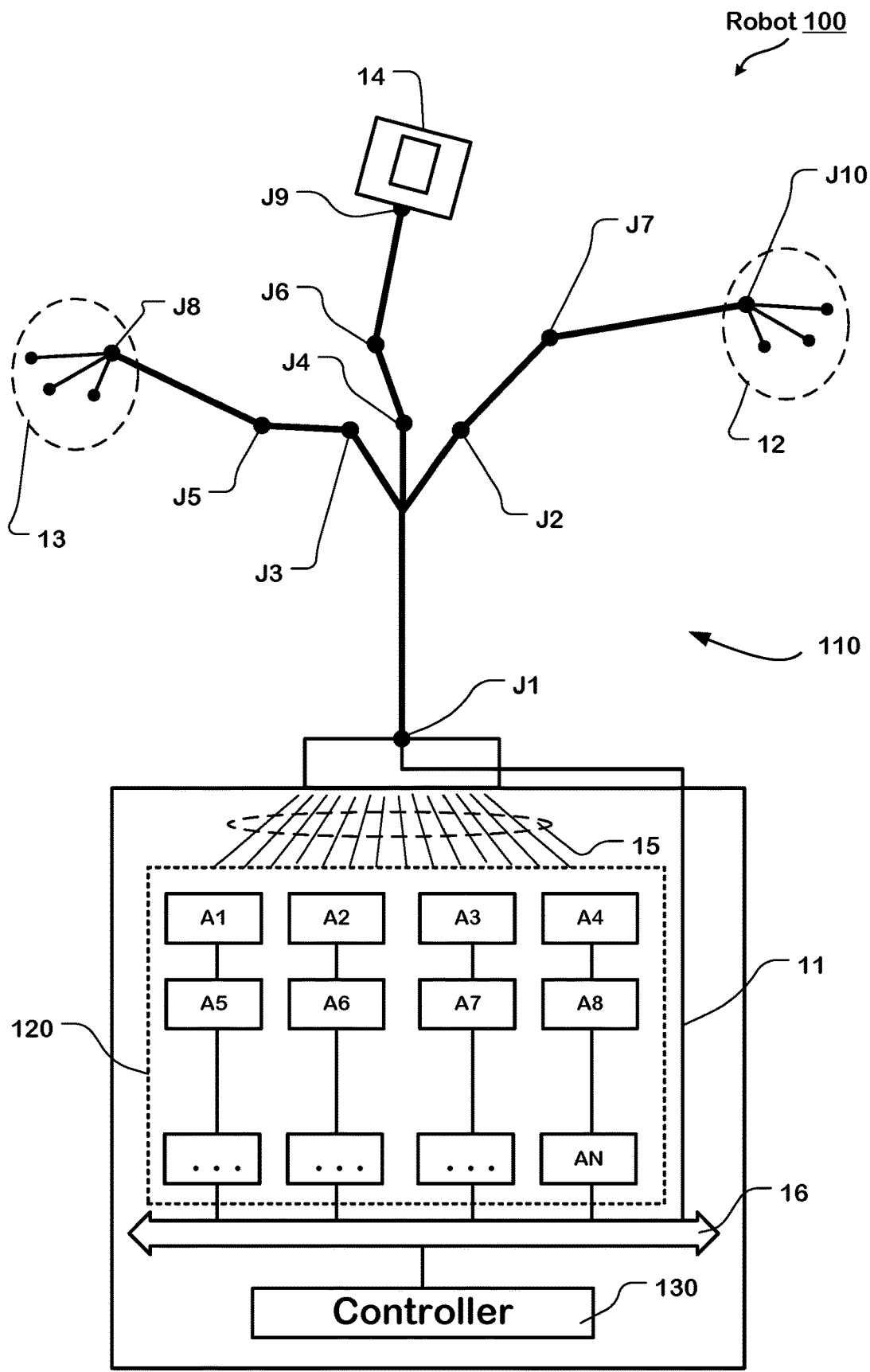
FIGS. 1A and 1B depict one implementation of an overall architecture of a robot disclosed herein.
Figure 1B:
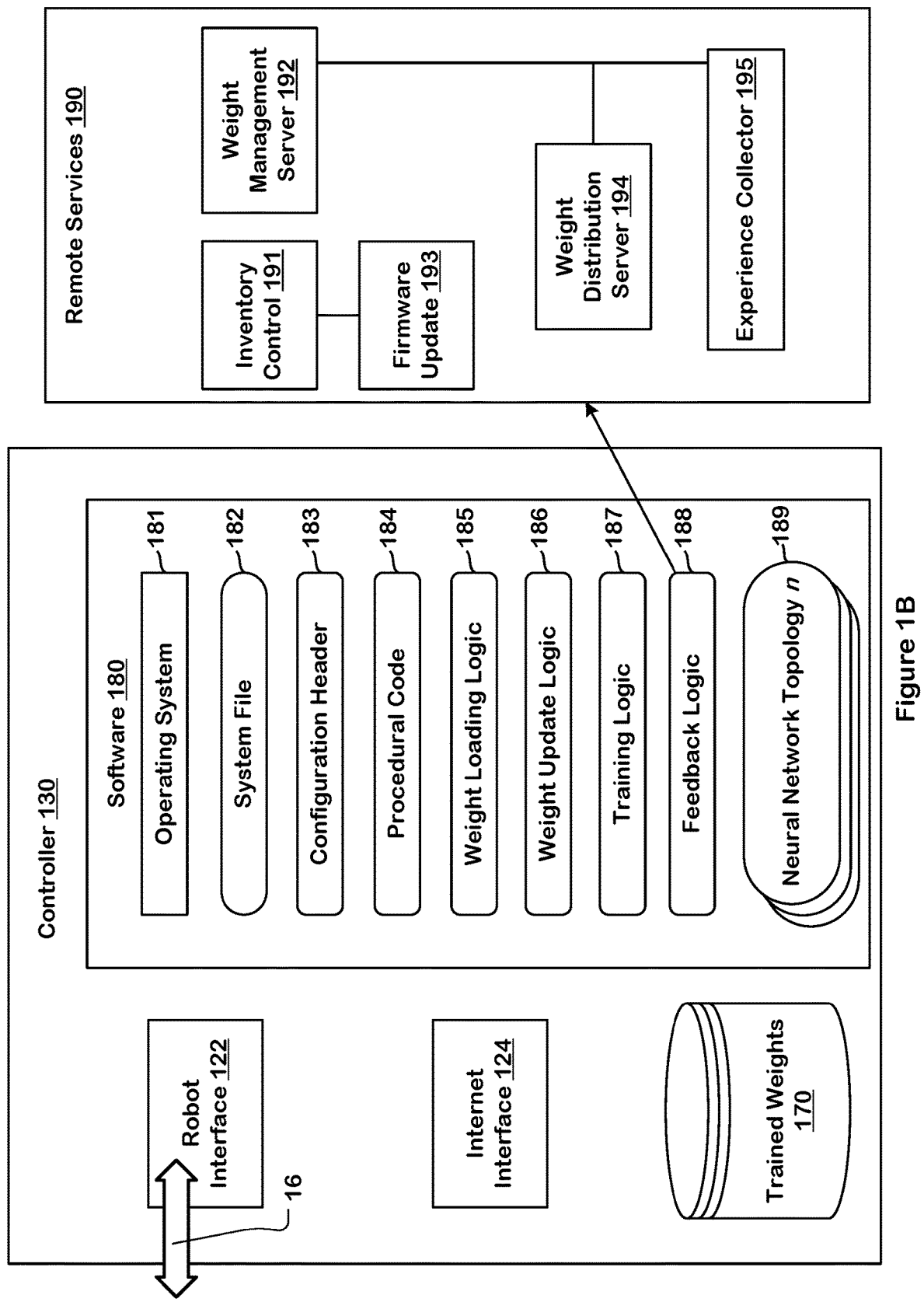

FIGS. 1A and 1B depict in simplified form an overall architecture of a robot 100 disclosed herein. The robot 100 comprises a main robot body 110 illustrated in FIG. 1A as a simplified kinematic chain including a plurality of joints (including joints labeled J1 to J10) and links between the joints. The kinematic chain can comprise any number and variety of joints and links as suits a particular implementation. Although the illustrated embodiment show a humanoid form, the robot need not be humanoid.

The kinematic chain includes a root joint J1 fixedly mounted on a robot pedestal 11. The robot pedestal 11 can be any type of structural frame or substrate for the root joint J1 of the kinematic chain. In some implementations, it is configured to be fixed to the ground. In other implementations, it is mounted on wheels, possibly with a brake and drive system for movement and positioning as may be required. In general, more than one kinematic chain may have root joints on the pedestal 11.

In this simplified example, the kinematic chain includes a link between joint J1 and joints J2, J3 and J4, corresponding to a "torso" of the robot. Also, the kinematic chain includes a first branch comprising joints J2, J7 and J10, and end effector 12 which can also include a plurality of joints and links configured for grasping. The kinematic chain includes a second branch comprising joints J3, J5 and J8, and end effector 13 which can also include a plurality of joints and links configured for grasping. The kinematic chain includes a third branch comprising joints J4, J6 and J9, and sensor element 14 which comprises in this example one or more sensors which alone or in combination generate sensor data indicating in three dimensions and in time, a position of the end effectors and of an object.

The illustration in FIG. 1A shows a set of tendons 15 extending from corresponding actuation points (not shown) for tendon-driven joints, and other possible tendon-driven elements on the kinematic chain, to an actuation system comprising actuators A1 to AN and a controller 130 mounted on the pedestal, off the kinematic chain. The actuators A1 to AN actuate the tendons, which translate motion and power to actuation points for tendon-driven joints or other tendon-driven elements on the kinematic chain.

As illustrated, the actuators A1 to AN are coupled to a communication network 16 for communication with a controller 130. Also, the communication network 16 is connected to components on the kinematic chain, including the sensor element 14, and other sensor components such as joint angle sensors, tactile sensors, pressure sensors, and proximity sensors positioned on the end effectors or on the branches including the end effectors.

The communication network 16 can include wired and wireless links for communication of data and control information among the actuators and other components.

Generally, a main robot body 110 can referring to a humanoid form for example, have a plurality of appendages (e.g., head, left and right arms) which form branches of the kinematic chain on a root structure (e.g., spine, torso, abdomen, waist, trunk, pelvis, hip) connected between the branches and the root joint on the pedestal. The plurality of appendages can include one or more manipulator appendages (e.g., left and right arms) with end effectors (e.g., left and right hands), and a root appendage connecting the manipulator appendages. The plurality of joints includes manipulator joints (e.g., shoulder joints, arm joints, forearm joints, elbow joints, wrist joints) that are configured to move the manipulator appendages along one or more degrees of freedom (DoFs). The plurality of joints also includes end effector joints (e.g., finger and thumb joints) that are configured to move the end effectors along the one or more DoFs. The plurality of joints also includes root appendage joints (e.g., torso joint, abdomen joint) that are configured to move the root appendage along the one or more DoFs.

An implementation of the controller 130 is illustrated in FIG. 1B. The controller 130 includes a software component 180 comprising software which can be stored in non-transitory memory, and executable by one or more processors in the controller. The controller 130 includes a robot interface 122 connected to the network 16. The controller 130 includes an Internet interface 124 for connection to the Internet or other wide area network. The controller 130 includes a data store 170 for non-volatile storage of weights which in combination define models of neural networks, and other parameters utilized in the controller and configuration of the controller 130. In embodiment of the robot, the controller is in communication with the plurality of actuators and the sensors to operate the kinematic chain, and includes memory storing a system file identifying a set of neural network topologies, neural network execution circuits, configurable to execute neural network topologies in the identified set, and circuits to apply feedback data derived from or including the actuator data and the sensor data as input to the neural network execution circuits. In some example, the controller including a program or software component 180 to load and unload neural network topologies from the set according to a specified a task to manipulate the object in response to the feedback data.

The software component 180 can include an operating system 181, a system file 182 (e.g., XML file), parameter sets including a configuration header 183, a code block comprising procedural code 184, weight loading logic 185, weight update logic 186, training logic 187, feedback logic 188, and a number "n" of neural network topologies 189.

The configuration header 183 includes logic to identify configuration files which configure the controller 130 for particular tasks. The system includes parameters such that during execution, when a weight loader logic is encountered, the configuration header is accessed to identify configuration files that enable selected topologies and load the weights that comprise trained models for the topologies, and to configure the neural networks and other control modules using the procedural code 184. For example, the configuration header can include a globally unique identifier (GUID) for each particular neural network to be instantiated for a given procedure. Control procedures are described in more detail below. Implementations of the control procedures can compensate for imprecision of tendons in the tendon-driven joints of the robot, including losses in precision due to variability of the tendons.

The system may include logic to determine whether the weights for that particular neural network have already been uploaded previously. If the system determines that the weights have not been uploaded, the system includes logic to access the weight distribution component of remote services 190 and request a weight block for the neural network identified by the GUID in the configuration header. The system retrieves the weights for the neural network, writes the weights in the block of memory for the neural network from where the weights can be accessed by the neural network during execution.

The weights can be loaded in the memory when the robot is initialized or operated for a first time. The weights can also be updated at other instances. For example, the remote services 190 can direct the system component of the robot that new weights are needed for a particular robot. The system can then reset the configuration header such that the application logic initiates a weight update procedure as described above. This logic can be used to update the weights of neural network when better performing neural network models have been trained, enabling the system to propagate updated weights to one or more robots. The system can, therefore, update weights of the neural network which can have an impact of changing the behavior of the robot or improving robot task performance. This can be achieved without updating the system and application software through firmware update 193. In one implementation, the remote services 190 can run training simulations and periodically update weights of neural networks in robots after more training hours such as every one-thousand hours etc.

The robots can be Internet enabled and can communicate with cloud-based remote services 190 through network(s) 171 (e.g., wireless communication via APIs) for access to memory storing the system file or network topology data and weights. The robots can receive input data from remote services 190 and send their status information or other data back to remote services 190.

The controller 130 operates the robot 100. The robot 100 includes the kinematic chain. The kinematic chain includes a plurality of joints and links that are responsive to controller output of the controller 130. In one implementation, the controller 130 comprises a neural network trained to operate the kinematic chain to perform a task. The neural network has a topology (e.g., one of the topologies 189) configured to use a trained weight block (e.g., trained weights 170) to execute runs of the neural network.

The controller 130 comprises the configuration header 183 that is configured to include a weight block identifier that identifies an instance of the trained weight block for the neural network.

The controller 130 comprises the weight loading logic 185, which has access to the configuration header 183. The weight loading logic 185 is configured to use the weight block identifier to retrieve and provide the instance of the trained weight block to the topology to execute runs of the neural network to generate the controller output. In one implementation, the weight block identifier is a globally unique identifier (GUID).

The weight loading logic 185 is further configured to retrieve the instance of the trained weight block from a weight management server 192 in the remote services 190. The weight management server 192 is configured to store a plurality of instances of the trained weight block. In one implementation, the configuration header 183 is further configured to include association data that associates the weight block identifier with a neural network identifier. The neural network identifier identifies the neural network. In some implementations, the controller 130 further comprises the system file 182 that provides the association data. The configuration header 183 reads the association data from the system file 182. In one implementation, the system file 182 is in an extensible markup language (XML) format.

In one implementation, the controller 130 further comprises the weight update logic 186, which is configured to update the system file 182 and the configuration header 183 to include new association data that associates a new weight block identifier with the neural network identifier. The new weight block identifier identifies a new instance of the trained weight block. The weight loading logic 185 is further configured to use the new weight block identifier to retrieve and provide the new instance of the trained weight block to the topology to execute runs of the neural network to generate the controller output. The weight loading logic 185 is further configured to retrieve the new instance of the trained weight block from the weight management server 192.

In some implementations, the new instance of the trained weight block configures the neural network to operate the kinematic chain to perform a new task. In other implementations, the instance of the trained weight block configures the neural network to operate the kinematic chain to perform the task with a first accuracy rate. In one implementation, the new instance of the trained weight block configures the neural network to operate the kinematic chain to perform the task with a second accuracy rate that is greater than the first accuracy rate. In another implementation, a first training instance generates the instance of the trained weight block, and the first training instance uses a first training dataset and a first plurality of training cycles. In yet another implementation, a second training instance generates the new instance of the trained weight block. The second training instance uses a training dataset and a second plurality of training cycles. The second training dataset can in some cases utilize more training examples than the first training dataset or improved training examples relative to the first training dataset. The second plurality of training cycles can for example have more training epochs than the first plurality of training cycles.

In some implementations, the controller 130 further comprises a plurality of neural network execution circuits having different topologies for different tasks, such that neural networks in the plurality of neural networks are trained to operate the kinematic chain to perform respective tasks in a plurality of tasks, the neural networks have respective topologies in a plurality of topologies, and the topologies are configured to use respective trained weight blocks in a plurality of trained weight blocks to execute runs of respective neural networks in the plurality of neural networks. In such implementations, the configuration header 183 is further configured to include a plurality of weight block identifiers, such that weight block identifiers in the plurality of weight block identifiers identify the respective trained weight blocks in a plurality of trained weight blocks. In such implementations, the configuration header 183 is further configured to include association data that associates the weight block identifiers with respective neural network identifiers in a plurality of neural network identifiers, such that the neural network identifiers identify the respective neural networks in the plurality of neural networks. In such implementations, the weight loading logic 185 is further configured to use the respective weight block identifiers to retrieve and provide the trained weight blocks to the respective topologies to execute runs of the respective neural networks to generate respective controller outputs.

In some implementations, the controller 130 further comprises the training logic 187, which is configured to further train the neural network to generate the controller output based on actuation data and sensor data generated by the kinematic chain during performance of the task, and generate an evolved instance of the trained weight block.

In some implementations, the controller 130 further comprises additional untrained neural networks that are trained by the training logic to generate the controller output based on the actuation data and the sensor data generated by the kinematic chain during performance of the task, and generate a specialized instance of the trained weight block.

In some implementations, the controller 130 further comprises the feedback logic 188 configured to send the evolved instance of the trained weight block and the specialized instance of the trained weight block to the weight management server 192. In one implementation, the feedback logic 188 is further configured to send the actuation data and the sensor data generated by the kinematic chain during performance of the task to a training data collection server (e.g., the experience collector 195).

In some implementations, the weight management server 192 is further configured to provide the evolved instance of the trained weight block and the specialized instance of the trained weight block to other robots to configure neural networks of the other robots with the evolved instance of the trained weight block and the specialized instance of the trained weight block. In one implementation, the weight management server 192 distributes the trained weights and other data (e.g., training data sensed from other robots) among robots using a weight distribution server 194.

In some implementations, the training data collection server (e.g., the experience collector 195) is configured to provide the actuation data and the sensor data generated by the kinematic chain during performance of the task as training data for use in training the neural networks of the other robots.

In one implementation, the controller 130 is operatively coupled to the robot. In another implementation, the controller 130 is in communication with the robot 100. Inventory control 191 is used to make firmware updates 193 to the robot 100 and to a population of robots.

In one implementation, we disclose a computer-implemented method of remotely updating weights of a neural network, the neural network having a topology configured to use a trained weight block to execute runs of the neural network. The method includes accessing a weight block identifier that identifies an instance of the trained weight block for the neural network; using the weight block identifier to retrieve the instance of the trained weight block from a server, and providing the instance of the trained weight block to the topology to execute runs of the neural network; updating the weight block identifier to identify a new instance of the trained weight block for the neural network; and using the new weight block identifier to retrieve the new instance of the trained weight block from the server, and providing the new instance of the trained weight block to the topology to execute runs of the neural network.

More information concerning a control architecture is provided below.

FIGS. 1A and 1B, in general, illustrate a robot comprising a robot pedestal with a kinematic chain comprising a plurality of joints and links, including a root joint connected to the robot pedestal, and at least one end effector. A plurality of actuators in this example, is fixedly mounted on the robot pedestal, wherein the actuators in the plurality of actuators produce actuator data indicating current actuator states. The actuators in the plurality of actuators respond to actuator command data to drive the actuators, and adjust actuator states, causing movement or applying force to corresponding tendons. A plurality of tendons is connected to a corresponding plurality of actuation points on the kinematic chain and to actuators in the plurality of actuators. The tendons in the plurality of tendons are arranged to translate actuator position and force to actuation points on the kinematic chain with some imprecision, or losses in precision, due to variability of tendons in the plurality of tendons that can arise from non-linearities in the actuation links, from environmental conditions such as temperature and humidity, and over time from wear on the tendons. A controller, such as described above, is in communication with the plurality of actuators to operate the kinematic chain to perform a task, and configured to generate actuator command data in dependence on the actuator states reflected by the actuator data and other available information. The controller includes a trained neural network which compensates for the losses in precision of the tendon-driven mechanisms in performance of the task.

In some implementations, there are no actuators beyond the root joint on the kinematic chain. In some implementations, all the moveable joints on the kinematic chain, including the root joint, are tendon-driven by actuators in the plurality of actuators A1 to AN mounted on the pedestal.

In some implementations, at least one end effector comprises a combination of links and joints on the kinematic chain configured for grasping an object, and the plurality of tendons connected to actuators in the plurality of actuators A1 to AN fixedly mounted on the pedestal includes tendons connected to actuation points on the combination of links and joints of the end effector, so that the tendons extend the length of the kinematic chain from the actuation points on the end effector to the pedestal.

In some implementations, the robot includes a first end effector and a second end effector, and the kinematic chain includes a first branch connected to the first end effector, and a second branch connected to the second end effector; and the plurality of tendons connected to actuators in the plurality of actuators A1 to AN, fixedly mounted on the pedestal which includes tendons connected to actuation points on the first and second branches.

Figure 2A:
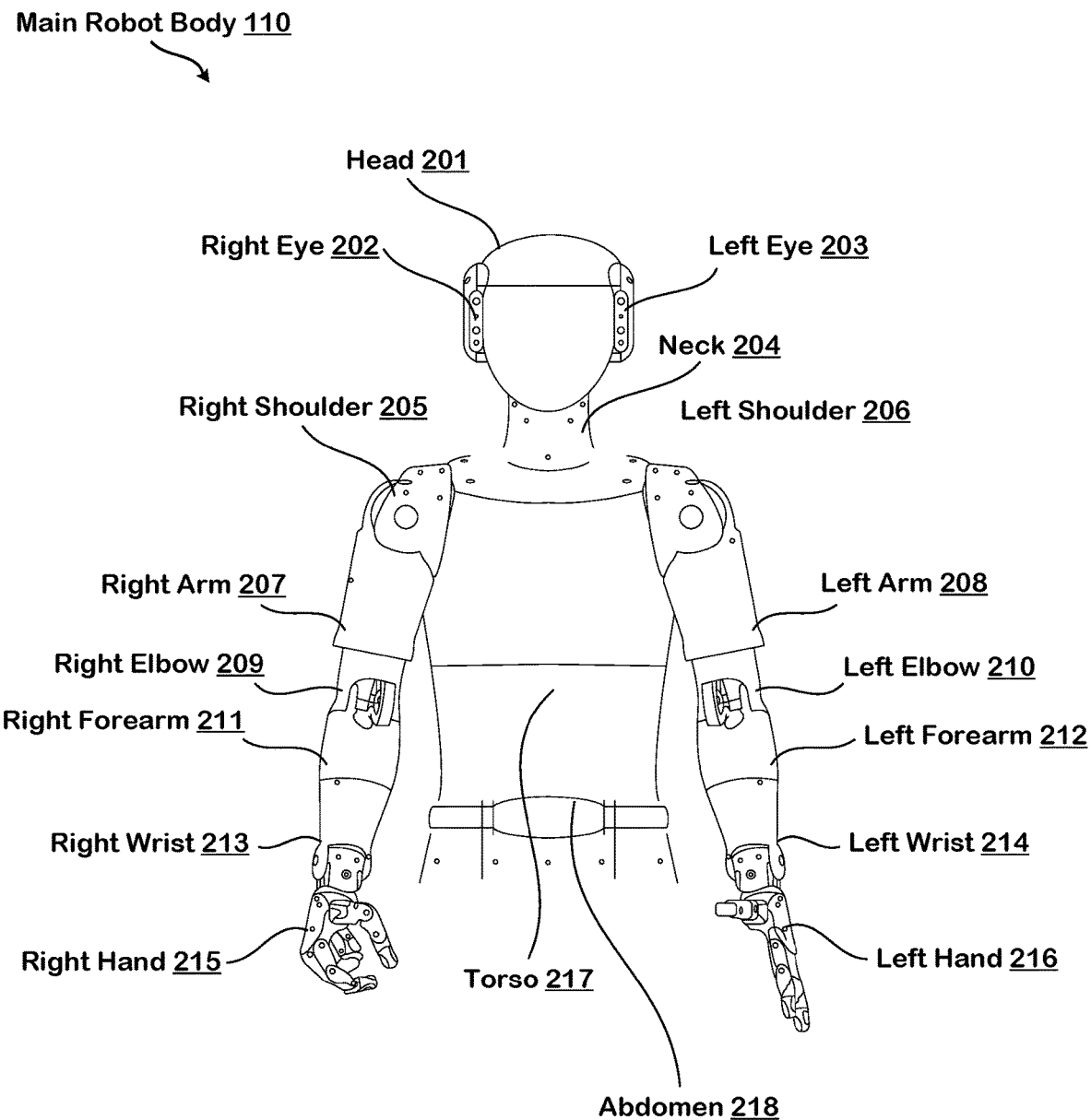
FIG. 2A is a front view of one implementation of a main robot body of the robot.
Figure 2B:
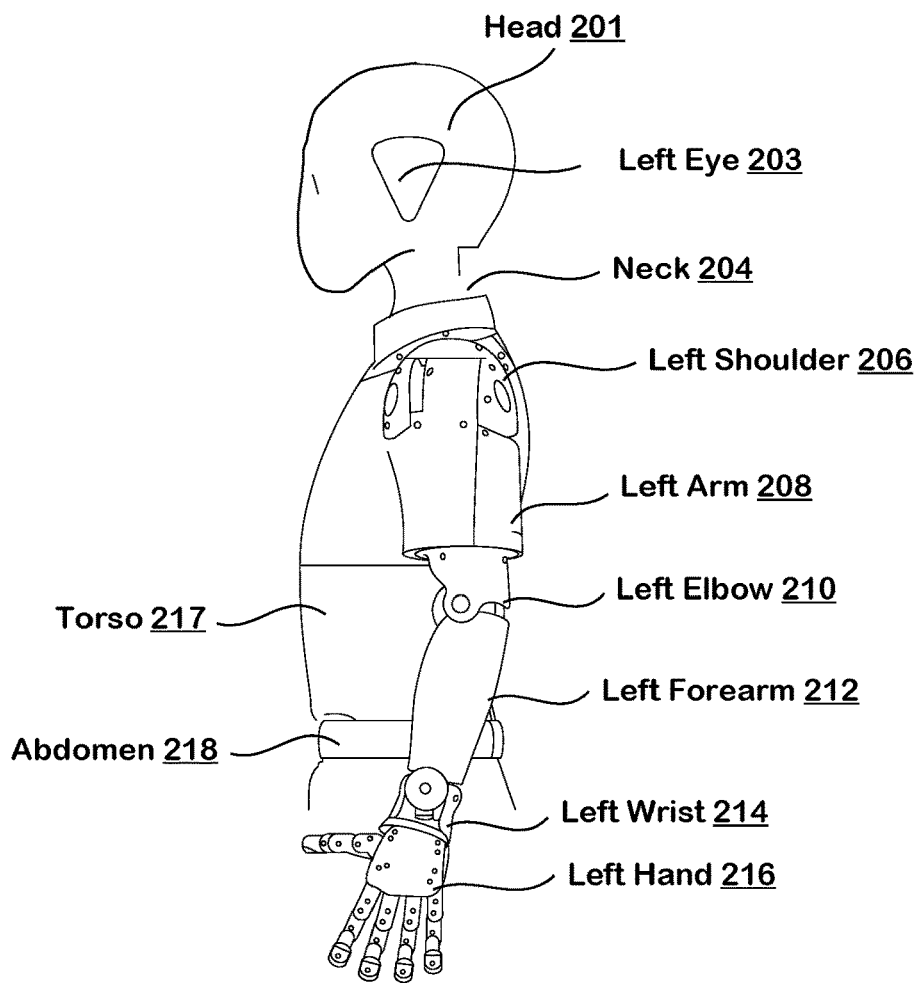
FIG. 2B is a left side view of the main robot body.

FIG. 2A is a front view 200A of one implementation of a humanoid, main robot body 110 implemented as described above. FIG. 2B is a left side view 200B of the main robot body 110. The main robot body 110 can include a plurality of body parts 201-218, corresponding to elements or links of the kinematic chain. Example body parts include a head 201 with a right eye 202 and a left eye 203, a neck 204, a right shoulder 205, a left shoulder 206, a right arm 207, a left arm 208, a right elbow 209, a left elbow 210, a right forearm 211, a left forearm 212, a right wrist 213, a left wrist 214, a right hand 215, a left hand 216, a torso 217, and an abdomen 218. The abdomen can for example include a turret joint, connected to the structural frame or pedestal, forming a root of the kinematic chain. The left and right shoulder joints form root joints of branches of the kinematic chain having end effectors that include the left and right hands, respectively. The neck is a root joint of the branch of the kinematic chain that carries the sensors in the left and right "eyes." In this example, the left and right "eyes" each include two image sensors which produce optical image data, such as RGB coded pixel data, and lidar range data produced be sensing timing of reflections of emitted energy, such as infrared light or ultrasound, from surfaces in the fields of view of the sensors. Thus, the sensor data can include four streams of sensor matrices, each stream including R, G and B matrix planes and distance matrix planes for each sensing interval.

Some body parts of the main robot body 110 can also be considered appendages of the main robot body 110. For example, a right manipulator appendage of the main robot body 110 can include the right shoulder 205 as branch root joint, the right arm 207, the right elbow 209, the right forearm 211, the right wrist 213, and the right hand 215. Similarly, a left manipulator appendage of the main robot body 110 can include the left shoulder 206 as branch root joint, the left arm 208, the left elbow 210, the left forearm 212, the left wrist 214, and the left hand 216. A root appendage of the main robot body 110 can include the torso 217 and/or the abdomen 218. The head 201 can also be considered an appendage of the main robot body 110. The neck 204 can also be considered a root joint of a branch defining an appendage of the main robot body 110 that carries the head and sensors. In some implementations, the right hand 215, along with its fingers and thumb, is considered an end effector of the right manipulator appendage of the main robot body 110. In some implementations, the left hand 216, along with its fingers and thumb, is considered an end effector of the left manipulator appendage of the main robot body 110.

The head 201 extends from the neck 204. The torso 217 extends between the neck 204 and a extraterritorial zone (pedestal) 402 (shown in FIG. 4A), and presents a pair of shoulders 205, 206. A pair of arms 207, 208, i.e., a right arm 207 and a left arm 208, extends from opposing sides of the torso 217. A pair of hands 215, 216, i.e., a right hand 215 and a left hand 216, extends from the right and left arms 207, 208, respectively. The right arm of the main robot body 110 can be considered to include a right shoulder portion 205, a right arm portion 207, a right elbow portion 209, a right forearm portion 211, a right wrist portion 213, and a right hand portion 215. The left arm of the main robot body 110 can be considered to include a left shoulder portion 206, a left arm portion 208, a left elbow portion 210, a left forearm portion 212, a left wrist portion 214, and a left hand portion 216.

Those skilled in the art will appreciate that since the main robot body 110 is intended to simulate a humanoid in this non-limiting example, the various extremities, e.g., shoulders 205, 206, arms 207, 208, hands 215, 216, etc. can be symmetrical and essentially include an identical symmetrical skeletal structure on both the right and left sides. Right and left components of the main robot body 110 are identified herein by designations "Right" or"R" and "Left" or "L" and, when viewed frontally, as in FIG. 1, the right arm 207 and right hand 215 will actually be on the left of the drawing.

In other implementations, the main robot body 110 can include fewer or additional body parts, with different numbers of branches of the kinematic chain. For example, the main robot body 110 can be attached to a root joint of an additional kinematic chain including joints analogous to a waist, a pelvis, a hip, legs, knees, ankles, and feet. In some implementations, the structural frame or pedestal of the robot includes a frame analogous to the pelvis or sacrum of a human, having three kinematic chains analogous to the left and right legs and the torso and upper body as illustrated in Figure IA Additionally, the main robot body 110 can be configured to be of a human scale, allowing the robot body 110 to share the same workspaces that are typically designed for human workers.

Figure 3A:
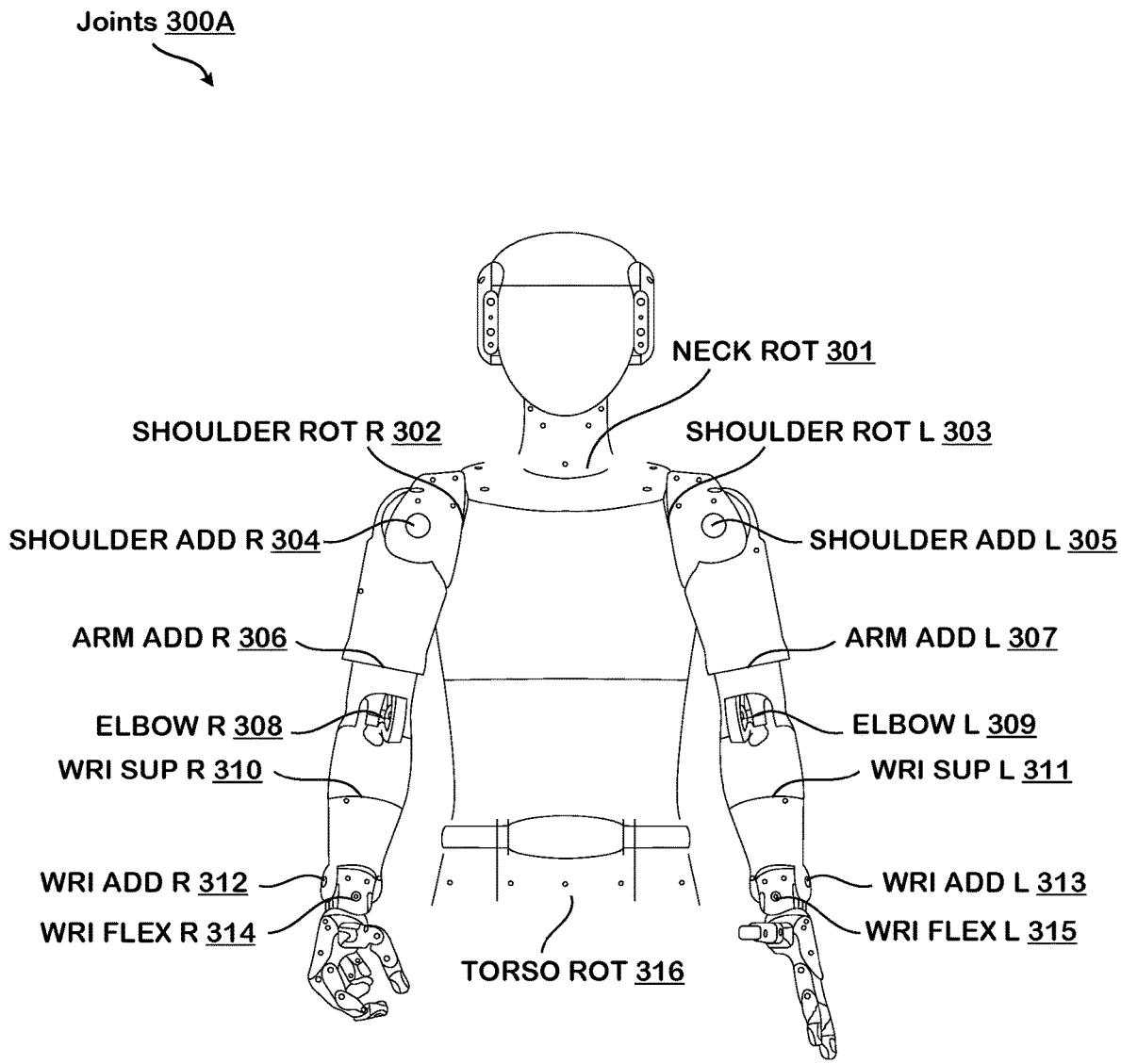
FIGS. 3A and 3B are front and left side views depicting example joints of the main robot body.
Figure 3B:
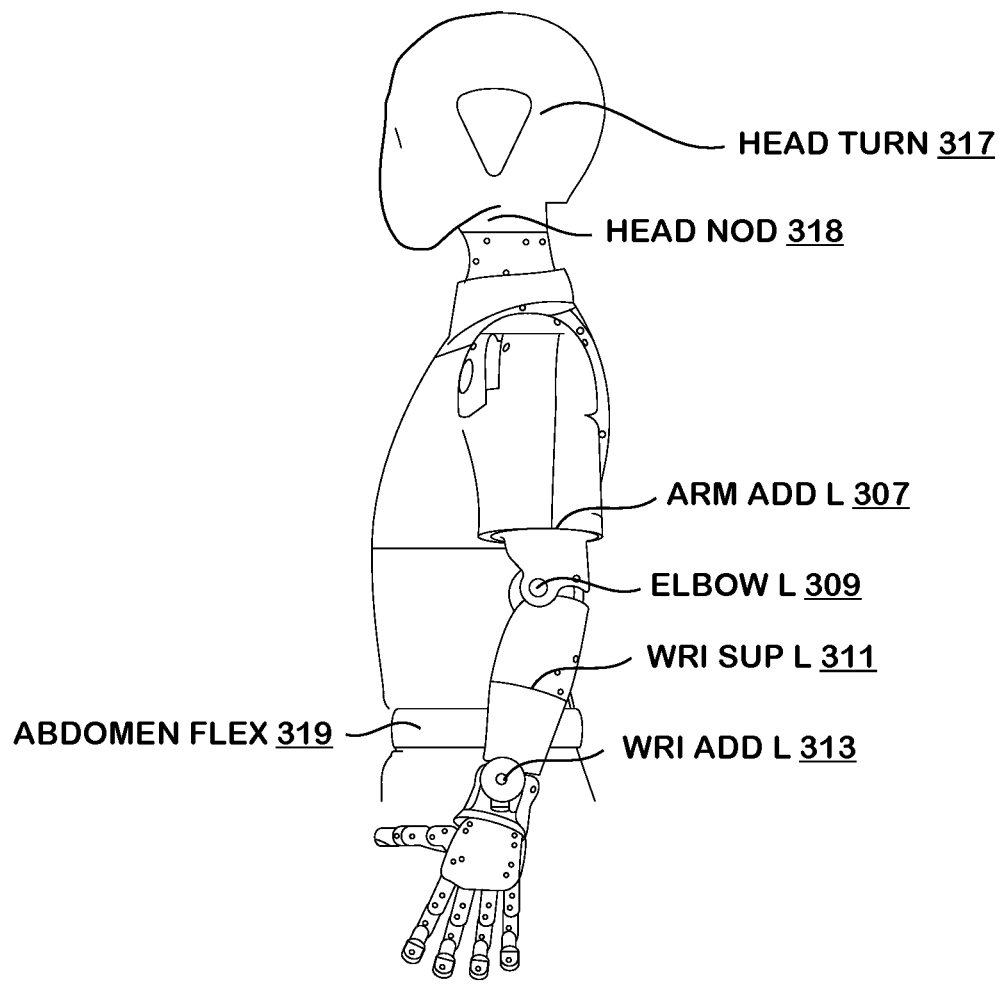
Figure 3C:
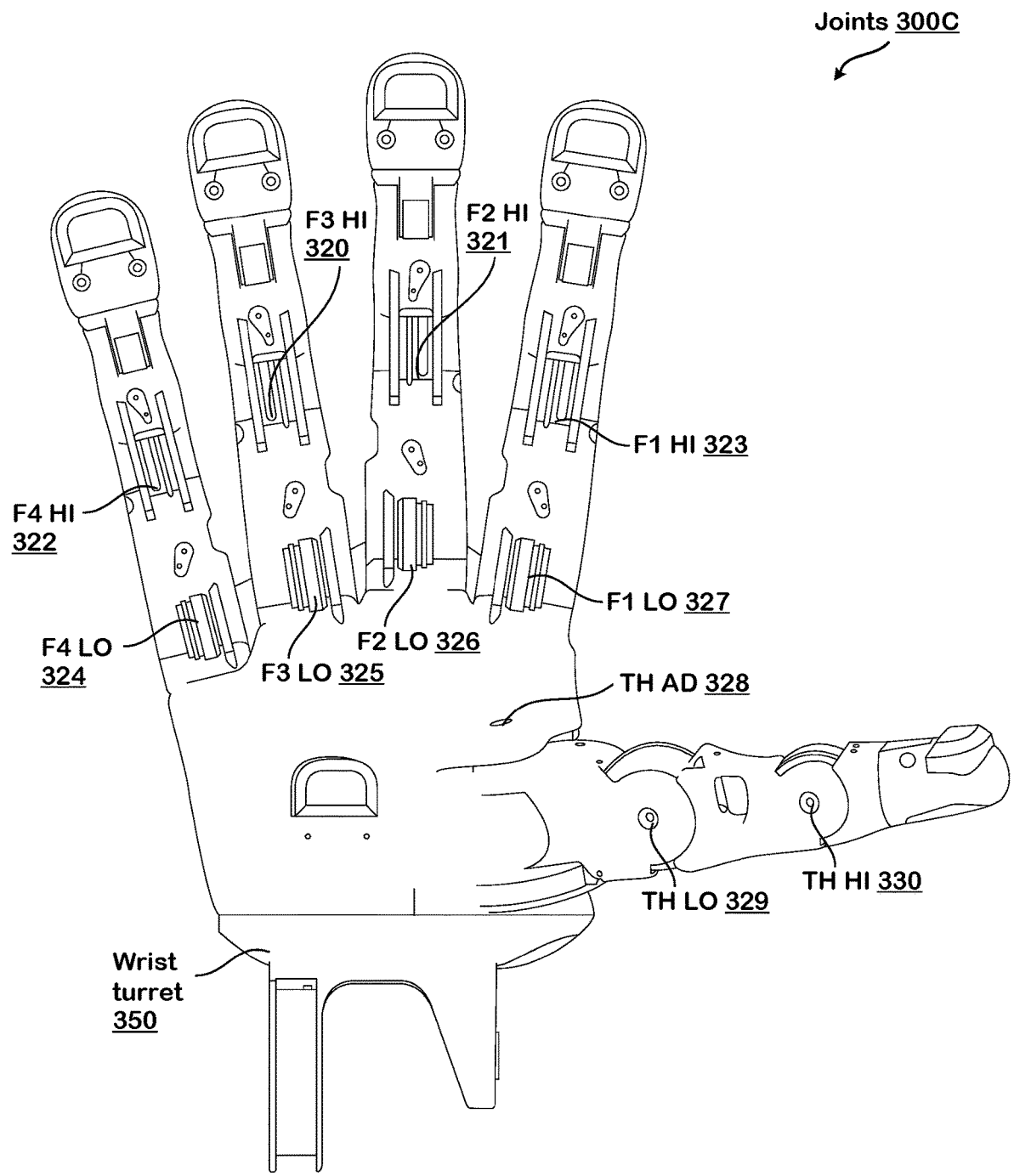
FIG. 3C illustrates an end effector for grasping and joints thereon, in the form of a hand.

FIGS. 3A, 3B, and 3C depict example sets of joints 300A, 300B, and 300C of the main robot body 110 on the kinematic chain. The sets of joints 300A, 300B, and 300C are disposed within or between the body parts 201-218 of the main robot body 110. Each of the joints 300A, 300B, and 300C, other than the root of the kinematic chain, is independently and interdependently movable by the controller relative to the pedestal.

Each of the joints 301-330 of the main robot body 110 can have one or more degrees of freedom (DoFs). The multiple DoFs provides the robot 100 with a level of dexterity required to manipulate standard tools and assembly components. For example, certain joints such as the head joints 317-318, the shoulder joints 302-303, the elbow joints 308-309, and the wrist joints 310-315 can have at least two DoFs in the form of pitch and roll. The neck joint 301 can have at least two or three DoFs. The finger joints 320-330 are positioned between the phalanges of each finger of the right hand 35 and the left hand 36 and can have at least two DoFs. In some implementations, each arm of the main robot body 110 can have at least three DoFs, including flexion/extension and adduction/abduction joints in the shoulder and flexion/extension in the elbow. In some implementations, the torso joint 316 can have at least two DoFs with flexion/extension and internal/external rotation joints. the main robot body 110 can have over forty DoFs, all of which can be controlled by the controller depending on task complexity.

In FIG. 3A, "NECK ROT" 301 is an example neck joint of the neck 204 that presents a corresponding DoF. The neck joint 301 can be defined between a base of the neck 204 and the torso 217. The neck joint 301 is configured to pivot about a neck axis relative to the torso 217. The neck joint 301 is also configured to tilt the neck 204 relative to the torso 217, along the neck axis. The neck axis extends generally between the pair of shoulders 205,206. The neck joint 301 is configured to provide an additional degree of travel to the head 201 to prevent the head 201 from contacting the torso 217 and/or the neck 204 when tilting the head 201 relative to the torso 217.

In FIG. 3B, "HEAD_TURN" 317 and "HEAD_NOD" 318 are two example head joints of the head 201 that present two corresponding DoFs. The first head joint 317 is configured to rotate the head 201 about a first head axis, relative to the neck 204 and the torso 217, and causes the head 201 to tilt or pitch. The first head axis is generally parallel to the neck axis that extends between the pair of shoulders 205, 206. The second head joint 318 is configured to rotate the head 201 about a second head axis, relative to the neck 204 and the torso 217, and causes the head 201 to yaw or pan. The second head axis is generally perpendicular to the neck axis that extends between the pair of shoulders 205, 206. Together, the neck joint 301, the first head joint 317, and the second head joint 318 provide a roll, pitch, and yaw arrangement respectively for movement of the head 201 relative to the torso 217. Additionally, the orientation of the head 201 varies based on its movement along the first and second head axes. In some implementations, the head 201 has six DoFs, but the neck 204 has two or three DoFs.

The right arm of the main robot body 110 can be considered to have seven right arm joints 302, 304, 306, 308, 310, 312, and 314 that present a corresponding seven DoFs. The left arm of the main robot body 110 can be considered to have seven left arm joints 303, 305, 307, 309, 311, 313, and 315 that present a corresponding seven DoFs. It should be appreciated that the right and left arms of the main robot body 110 are not limited to each having only seven DoFs, as any desired number of arm joints and DoFs can be used as known to those skilled in the art.

FIG. 3C shows an end effector configured for grasping, in this example formed to emulate a hand having four fingers and a thumb. It includes eleven finger joints 320-330 for the right hand 215 that present a corresponding eleven DoFs. The left hand 216 (see FIG. 2B) also the eleven finger joints 320-330 that present a corresponding eleven DoFs. The hand is a humanoid example of an end effector that comprises an end effector root joint on the kinematic chain, and a combination of links and joints downstream from the end effector root joint configured for grasping an object, and wherein the plurality of tendons includes tendons connected to actuation points on the at least one end effector, and the actuators coupled to tendons in plurality of tendons connected to the actuation points on the end effector are positioned upstream from the end effector root joint.

The finger joints 320-330 allow the hands 215, 216 to achieve an accepted number of manufacturing grasps. It should be appreciated that the number of achievable manufacturing grasps are of the type known to those skilled in the art. More specifically, each hand 215, 216 includes four fingers and an opposable thumb that are configured to partially hyperextend to obtain excellent pre-grasp positions before acquiring an object or to maneuver in limited space and to achieve human-like dexterous, power, and tool grasps. The thumb joints 328, 329, 330 provide the thumb with a built-in twist that may achieve near human range of motion and a wide array of relative positions with respect to the four fingers. It should also be appreciated that the hands 215, 216 are not limited to having eleven finger joints 320-330 with eleven corresponding DoFs, as any desired number of finger joints and DoFs can be used as known to those skilled in the art.

The following is an example listing of eighteen right manipulator joints shown in FIGS. 3A, 3B, and 3C, wherein the joint 302 is the branch root joint of the right arm:

"SHOULDER_ROT_R" 302,
"SHOULDER_ADD_R" 304,
"ARM_ADD_R" 306,
"ELBOW_R" 308,
"WRI_SUP_R" 310,
"WRI_ADD_R" 312,
"WRI_FLEX_R" 314,
"F1_FLEX_LO_R" 327,
"F1_FLEX_HI_R" 323,
"F2_FLEX_LO_R" 326,
"F2_FLEX_HI_R" 321,
"F3_FLEX_LO_R" 325,
"F3_FLEX_HI_R" 320,
"F4_FLEX_LO_R" 324,
"F4_FLEX_HI_R" 322,
"TH_ADD_R" 328,
"TH_FLEX_LO_R" 329,
"TH_FLEX_HI_R" 330.

The following is an example listing of eighteen left branch manipulator joints, wherein the joint 303 is the branch root joint of the left arm:

"SHOULDER_ROT_L" 303,
"SHOULDER_ADD_L" 305,
"ARM_ADD_L" 307,
"ELBOW_L" 309,
"WRI_SUP_L" 311,
"WRI_ADD_L" 313,
"WRI_FLEX_L" 315,
"FL_FLEX_LO_L",
"FL_FLEX_HI_L",
"F2_FLEX_LO_L",

"F2_FLEX_HI_L",
"F3_FLEX_LO_L",
"F3_FLEX_HI_L",
"F4_FLEX_LO_L",
"F4_FLEX_HI_L",
"TH_ADD_L",
"TH_FLEX_LO_L",
"TH_FLEX_HI_L".

According to technology described herein, embodiments are enabled in which all of the left and right manipulator joints are tendon-driven, with tendons extending to actuators off the kinematic chain on the structural frame of the robot to which the root joint of the chain is attached. In some embodiments, the actuators for the tendon-driven joints on the arm branches are positioned at least two joints upstream of the actuation point for the joint. In some embodiments, all the actuators for the tendon-driven joints on the branches of the kinematic chain analogous to arms in this example, are positioned upstream of the branch root joints of the arms. In some embodiments, all the actuators for the tendon-driven joints on the end effectors analogous to hands are positioned at least upstream of the end effector root joint of the hand. In some embodiments, all the actuators for the tendon-driven joints on the end effectors analogous to hands are positioned at least upstream of an elbow flexion joint on a branch of the kinematic chain analogous to humanoid arm. In some embodiments, the actuators for all the tendon-driven joints on the end effectors analogous to hands are positioned upstream of the branch root joints (e.g. shoulders) of the arms.

In FIG. 3A, "TORSO_ROT (WAIST_BEND)" 316 is an example torso joint of the torso 217 and presents a corresponding DoF. The torso joint 316 can be the root joint of the kinematic chain fixed to, and extending from, a pedestal, and in this example rotates about a robot axis that extends from the bottom of the torso 217 to the top of the head 201. The torso joint 316 can be configured to provide a full three hundred sixty degrees of manipulation in the robot workspace and viewing range of the robot 100. It should be appreciated that the torso 217 is not limited to having only one torso joint 316, as any desired number of torso joints can be used as known to those skilled in the art to provide any desired number of DoFs.

In FIG. 3B, "ABDOMEN_FLEX (TWIST)" 319 is an example abdomen joint of the abdomen 218 and presents a corresponding DoF. The abdomen joint 319 also flexes about the robot axis that extends from the bottom of the torso 217 to the top of the head 201. It should be appreciated that the abdomen 218 is not limited to having only one abdomen joint 319, as any desired number of abdomen joints can be used as known to those skilled in the art to provide any desired number of DoFs.

In FIGS. 3A and 3B, "R" refers to right joint, "L" refers to left joint, "ROT" refers to rotation joint, "ADD" refers to adduction joint, "SUP" refers to supination joint, "FLEX" refers to flexion joint, and "WRI" refers to wrist joint. In FIG. 3C, "F" refers to finger joint, "TH" refers to thumb joint, "HI" refers to high joint, "LO" refers to low joint, and "AD" refers to additional joint. In other implementations, the main robot body 110 can include fewer or additional joints. For example, the main robot body 110 can include waist joints, pelvis joints, hip joints, leg joints, knee joints, ankle joints, and feet joints.

In some implementations, the main robot body 110 also includes one or more joint sensors, within the joints and/or between the joints. Examples of the joint sensors include position sensors, angular sensors, inertial measurement units (IMUs), photoelectric fork sensors, tension sensors, and force/torque sensors. In some implementations, the joint sensors can provide sensory feedback to encoders of actuators of the actuation system 120 via cable harnesses. Examples of the sensory feedback include rotation information (e.g., joint angles), position information (e.g., absolute joint positions, relative joint positions), speed information (e.g., joint angular velocities, joint accelerations), and torque information (e.g., joint loads). The main robot body 110 can also include other sensors like tactile sensors, and temperature sensors. This sensory feedback information provided by sensors on the kinematic chain can be provided as input to the controller, and combined the other sensor data gathered in during control intervals, which provides feedback data including or derived from the sensory feedback information and other sensor data (e.g., from cameras and depth sensors (e.g., infrared, LiDAR)) indicating in three dimensions the position and orientation of the object and the end effectors, input to the neural network that generates the actuator commands to drive the actuators.

Actuation System

Figure 4A:
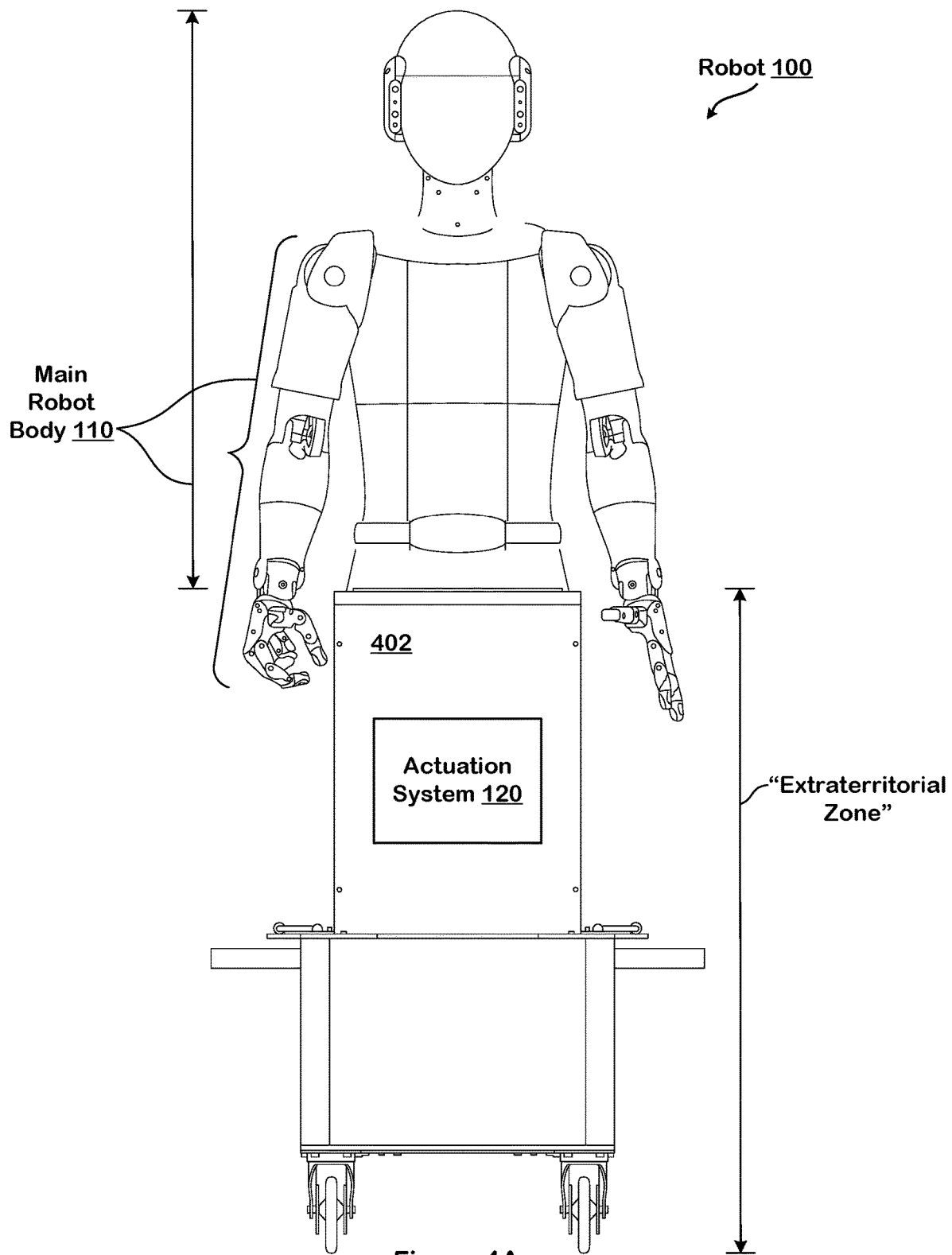
FIG. 4A is a front view of one implementation of demarcating the robot into the main robot body and an extraterritorial zone that contains an actuation system outside the main robot body of the robot.
Figure 4B:
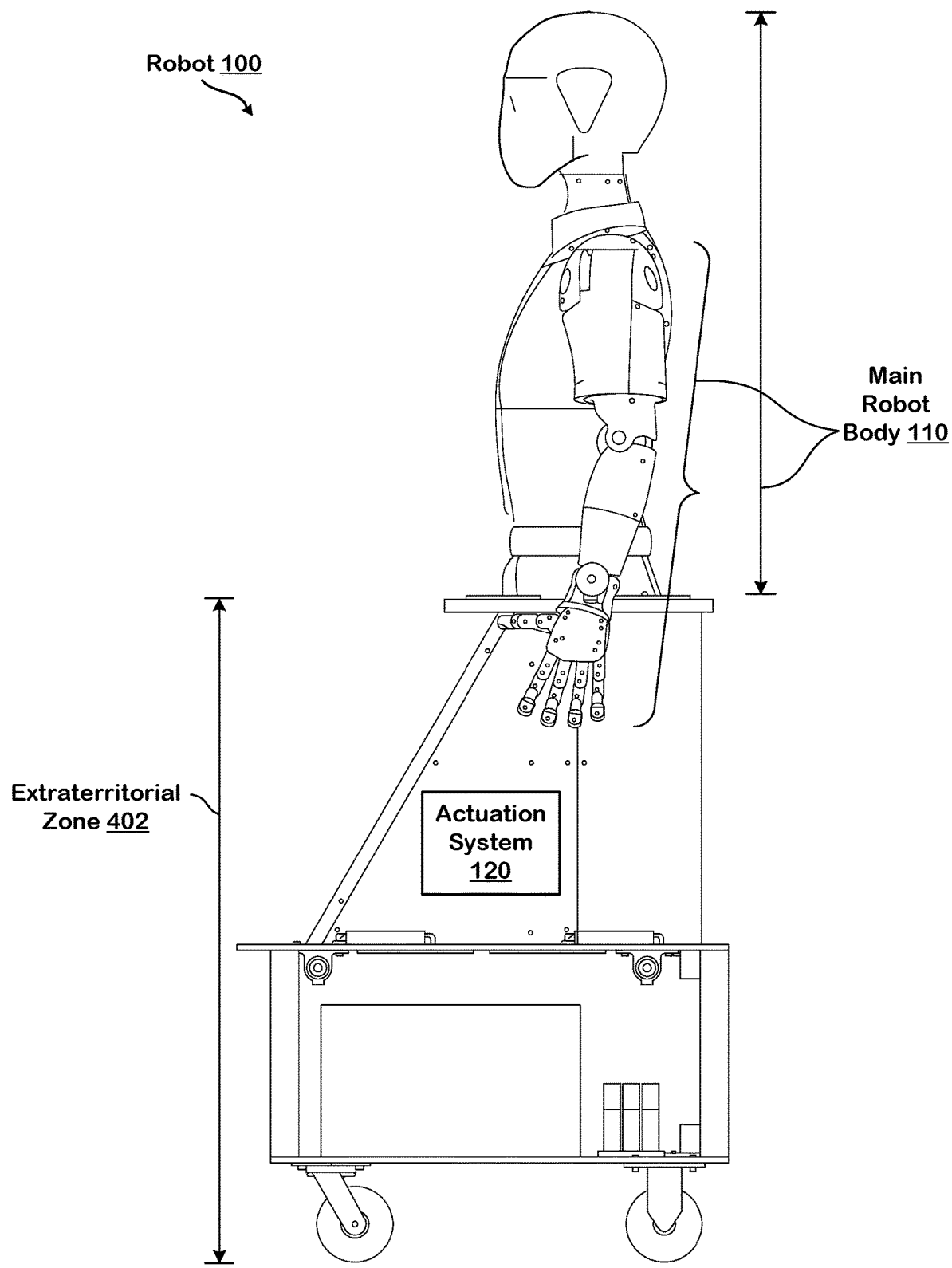
FIG. 4B is a left side view of the demarcation shown in FIG. 4A.

FIG. 4A is a front view 400A of one implementation demarcating the robot 100 into the main robot body 110 and robot pedestal 402 disposed in an "extraterritorial zone" for the purposes of description, which refers to parts of the structure below the kinematic chain in the main robot body. An actuation system 120, including all or some of the actuators for the robot in different embodiments, is disposed in the pedestal in this embodiment outside the main robot body 110 of the robot 100. The pedestal 402 to which the root joint of the kinematic chain of the main robot body 110 is attached is disposed in an extraterritorial zone. FIG. 4B is a left side view 400B of the demarcation shown in FIG. 4A.

Figure 5:
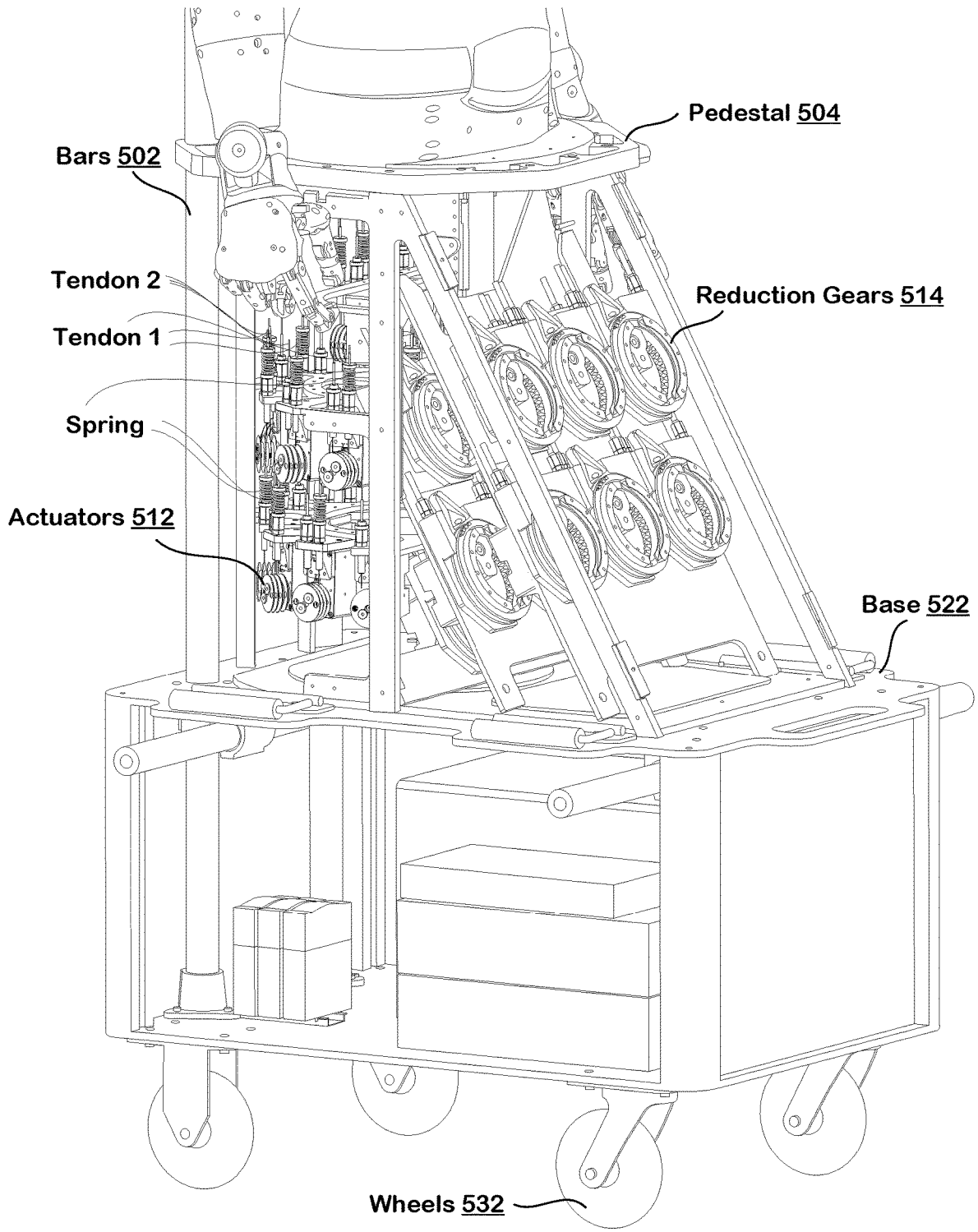
FIG. 5 is a view of one implementation of the actuation system comprising a plurality of actuators and a plurality of gear units.

FIG. 5 is a diagonal view of the actuation system 120 with covers removed to illustrate a configuration of actuators and reduction gears utilized in the tendon driving actuation system.

The actuation system 120 is disposed outside the main robot body 110 of the robot 100. The main robot body 110 does not contain the actuators 512 that actuate the tendons for tendon-driven elements of the main robot body 110. The actuators (e.g., 512) are spatially separated from the robot links 201-218 and the joints 310-330 they actuate, such that the actuators 512 are located beyond the root joint, in a structural frame with is stationary relative to the robot links 201-218 and the joints 310-330. Examples of the stationary part of the robot 100 include the pedestal 504 and the base 522. In some implementations, the actuation system 120 is located below a root joint on a root appendage of the main robot body 110. The root appendage can be the torso 217 of the main robot body 110. The root appendage can be the abdomen 218 of the main robot body 110. The root appendage can also be a waist, a trunk, a pelvis, or a hip of the main robot body 110.

In some implementations, the actuation system 120 is contained in a pedestal 504 that supports the main robot body 110 of the robot 100. The pedestal can be mounted on a base 522, which in turn is movable by wheels 532. The pedestal 504 and, thereby the robot 100, can be displaced using bars 502. In other implementations, the pedestal 504 can also include a task-suitable fixture such as legs, treads, or another moveable or fixed base depending on the particular application. A power supply may be integrally mounted to the robot 100, e.g., a rechargeable battery pack carried or worn on the back of the torso 217 or another suitable energy supply can be attached through an external cable to provide sufficient electrical energy to the joints 301-330 for the movement of the same.

Examples of the actuators 512 include servo actuators, joint actuators, linear actuators, stepper actuators, and rotary actuators. In some implementations, each of the actuators 512 comprises an actuator motor (e.g., DC motors, brush motors, brushless motors, AC motors, RC motors) and a gear unit. In one implementation, some or all of the actuators 512 comprises an incremental encoder, a DC motor, an industrial network module, a modularized mechanical structure, an intelligent controller, a contactless (magnetic) absolute encoder (AMS), a bearing-integrated gear unit, and one or more horns.

The following is an example listing of forty actuators in an example of the actuation system 120 mounted on the pedestal, that respectively actuate forty joints in the main robot body 110:

| "ARM_ADD_L": | "F2_FLEX_LO_L": | "HEAD_NOD": | "TH_FLEX_LO_L": |
|---|---|---|---|
| "ARM_ADD_R": | "F2_FLEX_LO_R": | "HEAD_TURN": | "TH_FLEX_LO_R": |
| "ELBOW_L": | "F3_FLEX_HI_L": | "SHOULDER_ADD_L": | "TWIST": |
| "ELBOW_R": | "F3_FLEX_HI_R": | "SHOULDER_ADD_R": | "WAIST_BEND": |
| "F1_FLEX_HI_L": | "F3_FLEX_LO_L": | "SHOULDER_ROT_L": | "WRI_ADD_L": |
| "F1_FLEX_HI_R": | "F3_FLEX_LOR": | "SHOULDER_ROT_R": | "WRI_ADD_R": |
| "F1_FLEX_LO_L": | "F4_FLEX_HI_L": | "TH_ADD_L": | "WRI_FLEX_L": |
| "F1_FLEX_LOR": | "F4_FLEX_HI_R": | "TH_ADD_R": | "WRI_FLEX_R": |
| "F2_FLEX_HI_L": | "F4_FLEX_LO_L": | "TH FLEX HI L": | "WRI_SUP_L": |
| "F2_F:EX_HI_R": | "F4_FLEX_LOR": | "TH_FLEX_HI_R": | "WRI_SUP_R": |

Systems as described herein can include more than 10 actuators for tendon driven joints in the kinematic chain mounted off of the kinematic chain, such as in a pedestal supporting the main body of the robot. Systems as described herein can include more than 20 actuators for tendon driven joints in the kinematic chain mounted off of the kinematic chain, such as in a pedestal supporting the main body of the robot. Systems as described herein can include more than 30 actuators for tendon driven joints in the kinematic chain mounted off of the kinematic chain, such as in a pedestal supporting the main body of the robot. Systems as described herein can include more than 40 actuators for tendon driven joints in the kinematic chain mounted off of the kinematic chain, such as in a pedestal supporting the main body of the robot.

In the illustrated embodiment, the actuation system includes a set of actuators mounted in a rack in the pedestal, as illustrated. Also, the actuation system includes in this example a set of reduction gears mounted in a rack adjacent to the actuator rack. Some of the actuators include pulleys mounted in the actuator rack with the actuators, for driving tendons connected at the distal ends to actuation points for the corresponding joints. Some of the actuators are coupled by drive mechanisms to reduction gears in the reduction gear rack. The reduction gears drive pulleys tendons connected at the distal ends to actuation points for the corresponding joints requiring greater torque. As illustrated in the figure, the rack for the actuators and the rack for the reduction gears are configured for compact and balanced structure. The actuator rack comprises a set of arcuate beams arranged in levels, with actuators disposed radially around the beams in each level. The reduction gear rack is comprised of multiple planar levels, disposed in a leaning arrangement, adjacent the actuator rack, and configured to receive drive axels from corresponding actuator motors on the actuator rack.

Each of the actuators 512 may have an actuator ID used to address the actuator on the communication system, and is further identified by actuator metadata such as the current limit, maximum voltage limit, minimum voltage limit, polarity, clockwise angle limit, counterclockwise angle limit, temperature limit, maximum torque, baud rate, and return delay time.

The following is an example of actuator data that is read in control intervals from each of the actuators 512:

```
struct present_data_dtype {
    int8_t torque_enable;
    int16_t goal_current;
    int32_t goal_position;
    int16_t present_current;
    int32_t present_velocity;
    int32_t present_position;
    uint16_t present_input_voltage;
    uint8_t present_temperature;
```

The actuator data identifies values for a plurality of actuator parameters. Examples of the actuator parameters include torque presently applied by an actuator on a corresponding joint, current presently drawn by the actuator, goal current to be drawn by the actuator, present velocity of the corresponding joint, present position of the corresponding joint, goal position of the corresponding joint, input voltage presently supplied to the actuator, present temperature of the actuator, and present angle of the corresponding joint.

In some implementations, each of the actuators 512 also includes one or more actuator sensors. Examples of the actuator sensors include position sensors, angular sensors, inertial measurement units (IMUs), photoelectric fork sensors, tension sensors, and force/torque sensors. In some implementations, the actuator sensors can sense sensory information about the appendages and the end effectors. Examples of the sensory information include rotation information (e.g., joint angles), position information (e.g., absolute joint positions, relative joint positions), speed information (e.g., joint angular velocities, joint accelerations), and torque information (e.g., joint loads).

The controller can be configured to provide feedback data to the neural network that includes or is derived from the actuator data and actuator sensor data for time intervals of the feedback loop in the controller.

Tendons

Figure 6A:
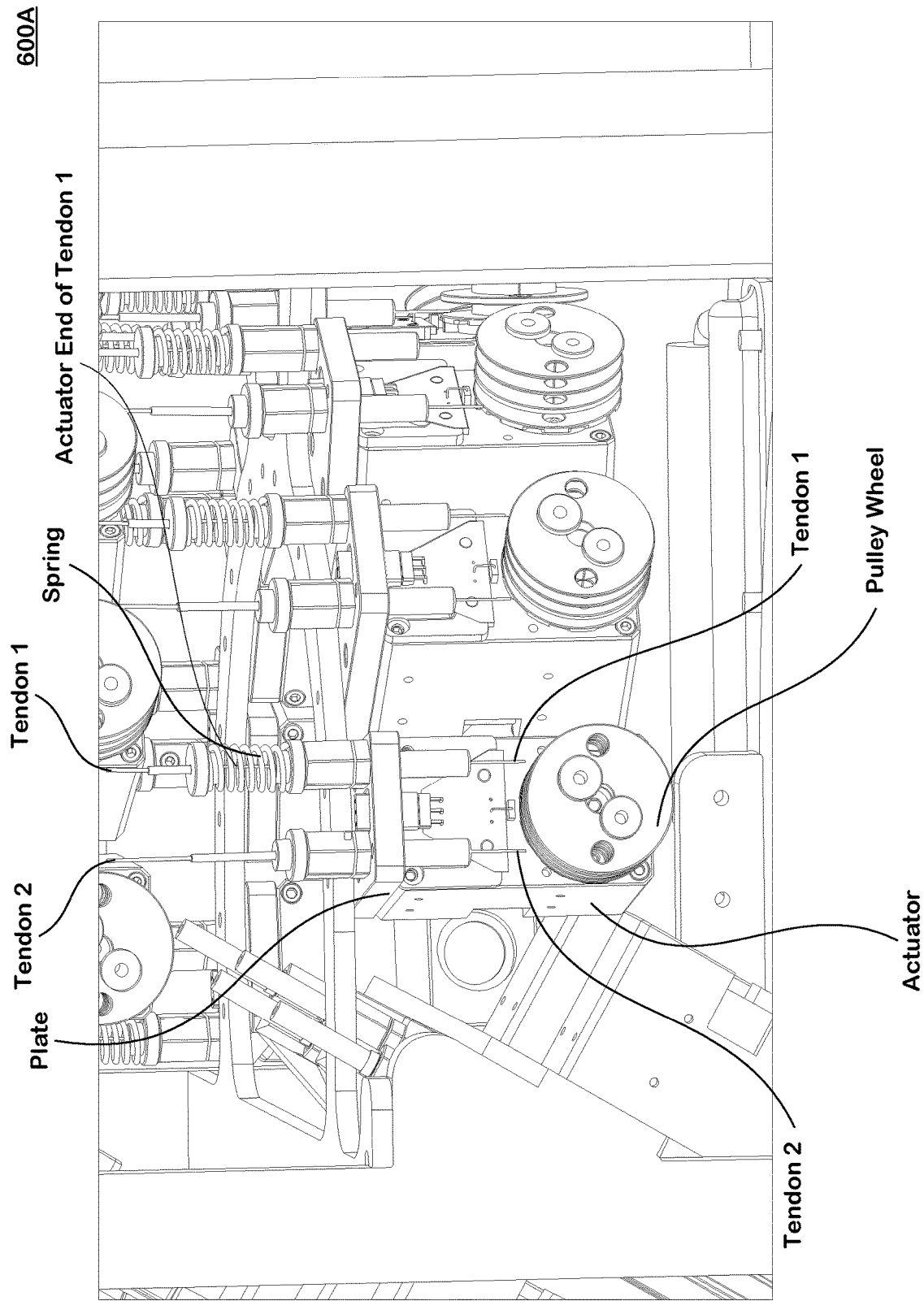
FIG. 6A is a zoomed-in view of the actuators of the actuation system.
Figure 6B:
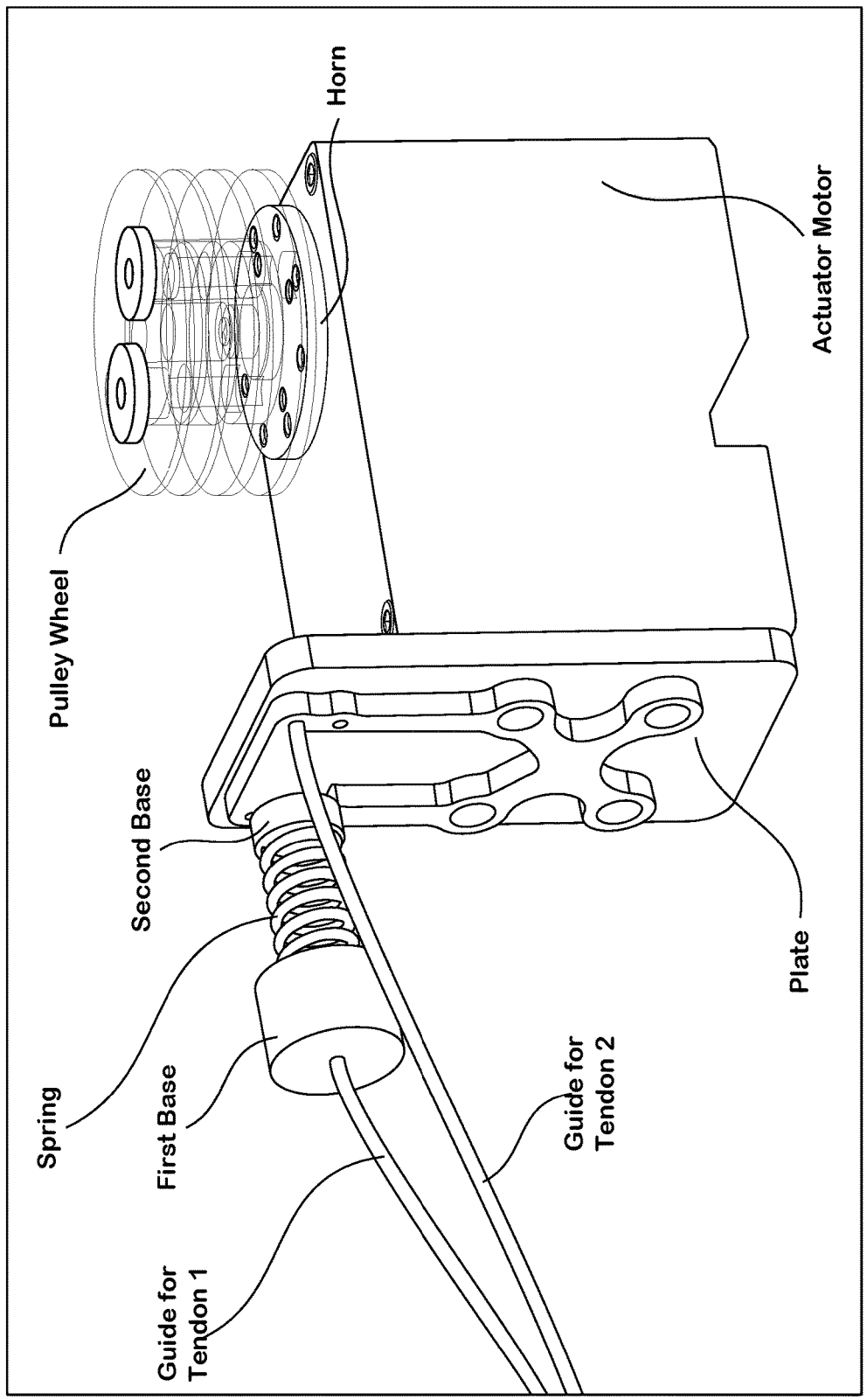
FIG. 6B is an individualized left view of a particular actuator of the actuation system.

FIG. 6A is a zoomed-in view 600A of some the actuators 512 on the actuator rack of the actuation system 120. FIG. 6B is an individualized left view 600B of a housing for particular actuator of the actuation system.

Each of the joints 301-330 of the main robot body 110 is actuated by one or more of the actuators 512 of the actuation system 120. Motion is transferred from the actuators 512 to the joints 301-330 via a tendon-driven mechanism. The tendon-driven mechanism can use one or more tendons (cables/wires) per actuator and per joint, including in some embodiments tendons that originate singularly from an actuator but downstream split into multiple tendons (e.g., at the joints or the appendage/end effector). For example, in the case of fingers in the right hand 215 and the left hand 216, a corresponding subset of the actuators 512 control the flexion and extension of the fingers through a differential pulley transmission. One end of the flexion tendons is inserted into the joints of the fingers, and the other end is directly connected to the corresponding subset of the actuators 512.

In one implementation, an actuator in the actuators 512 uses a set of tendons (e.g., tendon 1 and tendon 2 in FIG. 6A) to actuate a corresponding joint in the joints 301-330 of the main robot body 110. The tendons, in the set of tendons, extend from the actuator, traverse one or more links in the kinematic chain (appendages in the plurality of appendages) of the main robot body 110, and terminate at an actuation point at the corresponding joint. The actuator applies tension on the tendons to cause the tendons to generate torque at the corresponding joint and drive the corresponding joint along the one or more DoFs.

Actuators 512 of the actuation system 120 are configured to actuate a corresponding joints in the plurality of joints, typically independently of each other using a respective set of tendons. For example, a first actuator in the plurality of actuators actuates a first joint in the plurality of joints in dependence upon only the first actuator using a first set of tendons, a second actuator in the plurality of actuators actuates a second joint in the plurality of joints in dependence upon only the second actuator using a second set of tendons, and a third actuator in the plurality of actuators actuates a third joint in the plurality of joints in dependence upon only the third actuator using a third set of tendons.

In one implementation, the tendons are secured to horns of the actuators 512. Examples of the horns include circular/disk arms, double servo arms, triple servo arms, crossed/quadruple horns, and splined horns. In some implementations, the tendons are made of a polymer (e.g., rubber). The rubber tendons closely mimic their human counterpart and provide mechanical advantages that allow torques at the finger joints to gradually increase as long as the actuators keep pulling the tendons. In other implementations, the tendons are made of a nylon or metal (e.g., stainless steel).

In one implementation, the tendons include a weak side tendon, such as an extension tendon of a finger joint (e.g., tendon 1 in FIGS. 6A, 6B) and strong side tendon, such as a flexion tendon of a finger joint (e.g., tendon 2 in FIGS. 6A, 6B) that are mounted on a pulley wheel. In the illustrated configuration, the actuators pulleys have a pull-pull configuration. In this configuration, the pulley wheel in clockwise rotation pulls tendon 1 while feeding out tendon 2, and in counterclockwise rotation pulls tendon 2 while feeding out tendon 1.

Overtime, wear-and-tear introduces transmission inaccuracies and nonlinearities in the tendons that lead to imprecision of the translation of actuator motion and force to the kinematic chain. Examples of the nonlinearities include slack, dead band, and backlash hysteresis. The technology disclosed includes an elastic coupler-based tendon routing system that inserts a coupler in the tendon kinematic chain to absorb the nonlinearities infested over time. The removal and/or attenuation of the nonlinearities allows more accurate estimation of the pose of the robot using the actuator data (e.g., fingertip positions, joint angles, joint torques), but also impacts the precision of actuator data as an indicator of the robot pose.

In some implementations, the elastic coupler couples at least one tendon in the set of tendons to the actuator. Each tendon has two opposing ends: a joint end (or distal end) that terminates into an actuation point for a joint in the main robot body 110, and an actuator end (or proximal end) that terminates into the pulley wheel of an actuator in the actuation system 120. In a preferred implementation, the elastic coupler is located on the actuator end of a weak side tendon. In other implementations, the elastic coupler can be located on the joint end of the tendon.

In one implementation, the elastic coupler is an elastic element. One example of the elastic element is an extension fiber. Another example of the elastic element is a spring (e.g., coil/recoil spring).

Turning to FIGS. 6B, a housing for an actuator is illustrated, including an actuator motor case, a horn, and a three-channel pulley wheel on the horn, for a pull-pull configuration. The actuator motor case is connected to a support plate. A tendon guide tube for tendon 2 (tendons not shown) is fixed to the actuator case (e.g. by the illustrated plate). A tendon guide tube for tendon 1 is fixed to a first base of a spring, the second base of which is connected to the support plate. A first tendon is threaded through the tendon guide tube for tendon 1, a hole in the first base of the spring, the interior of the spring and a hole in the second base of the spring to one channel of the pulley wheel. A second tendon is threaded through the guide tube for tendon 2, through the plate to a second channel of the pulley wheel.

The spring can be pre-loaded so that it provides both extension force and compression force on the guide for tendon 1. As the first tendon is pulled by the actuator and the first is extended, the combination of the guide for tendon 1 and the spring are compressed, and the force of the spring tends against the compression to consume variability in the length of the tendon and reducing slack in the tendon. As the first tendon is extended by the actuator and the second is pulled, the combination of the guide for tendon 1 and the spring are extended, and the force of the spring tends to consume slack in the tendon.

The actuator has at least one horn and at least one pulley wheel mounted on the at least one horn. The tendons slide over the at least one pulley wheel. In some implementations, portions of the tendons that pass the plate and slide over the at least one pulley wheel are covered by guides.

In one implementation, the end effectors are fingers, and the corresponding finger joint is configured to move a respective finger in the fingers. In such an implementation, the tendons includes an extension tendon (e.g., tendon 1 in FIGS. 6A, 6B) that is configured to cause the corresponding finger joint to produce extension motion in the respective finger, and a flexion tendon (e.g., tendon 2 in FIGS. 6A, 6B) that is configured to cause the corresponding finger joint to produce flexion motion in the respective finger. The pulley wheel lengthens and shortens the extension tendon and the flexion tendon in opposition of each other.

In some implementations, the elastic coupler is located outside the main robot body 110. In one implementation, the elastic coupler is part of the actuation system 120.

In some implementations, the elastic coupler is an extended portion of the tendon (e.g., the flexion tendon (tendon 2) in FIGS. 6A, 6B, and 6C).

In some implementations, the set of tendons includes more than two tendons, and the coupler couples each tendon in the set of tendons to the actuator.

Anti-Backlash Gear Units

In addition to being driven by the actuators 512, some of the larger joints in the main robot body 110 are also driven by one or more reduction gear units 702. Examples of such larger joints include shoulder joints and forearm joints that demand large amounts of torque for actuation.

Figure 7A:
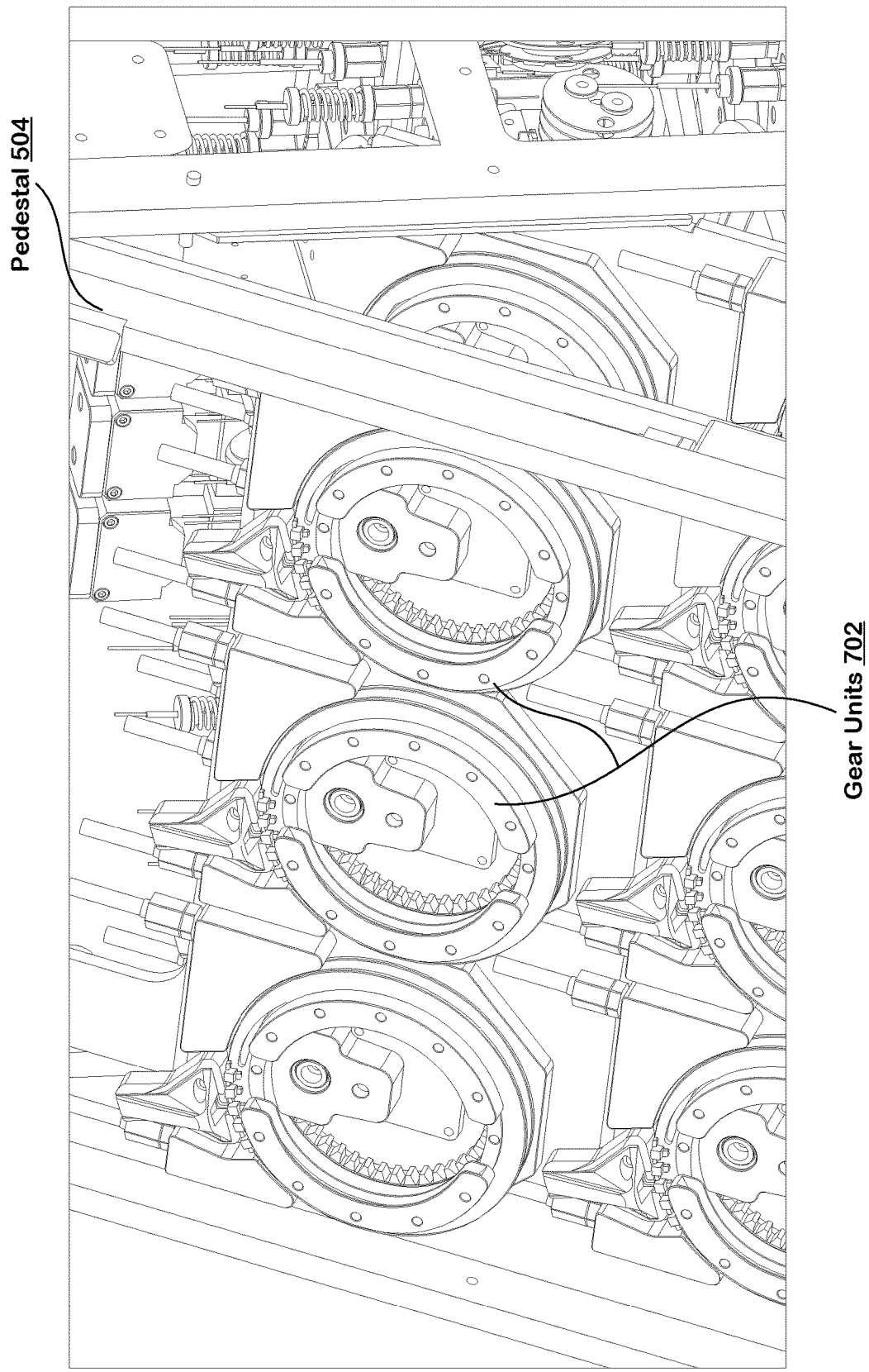
FIG. 7A is a zoomed-in view of gear units of the actuation system.
Figure 7B:
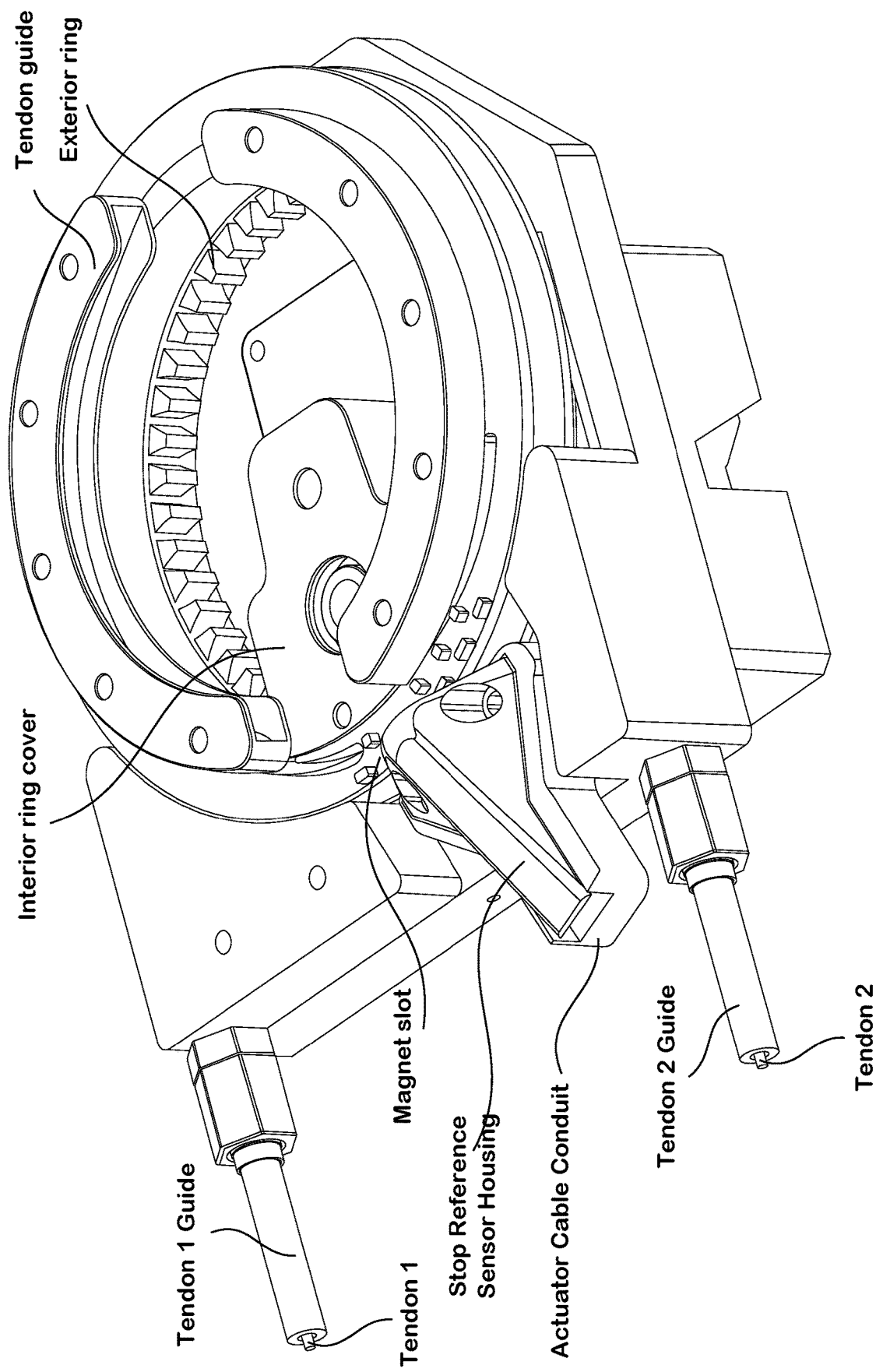
FIG. 7B is an individualized left view of a particular gear unit of the actuation system.

FIG. 7A is a zoomed-in view of some of the gear units 702 of the actuation system 120. FIG. 7B is an individualized left view of a particular gear unit of the actuation system.

The gear units 702 are fixedly mounted on the robot pedestal 504 in this example. The tendons (e.g., tendons 1 and 2 in FIG. 7B) are connected to a corresponding plurality of actuation points on the kinematic chain and to the gear units 702. The tendons are arranged to translate actuator position and force to actuation points on the kinematic chain.

The reduction gears in this example comprise planetary gears, including and exterior ring gear, and an interior gear with fewer teeth, which provides reduction and increases torque.

The exterior ring gear is connected to a channel for the tendons (tendon 1 and tendon 2) via a tendon guides (tendon 1 guide, tendon 2 guide). The gear unit further comprises an actuator cable conduit for electronic link to the controller.

Stop Sensor

Actuating large joints such as the shoulder joints can require multiple full rotations of an actuator shaft. Since the actuator encoder may report only the current shaft angle or a differential angle value, and does not report the number of full shaft rotations, there may be no way of knowing where the corresponding joint currently lies within its maximum range of motion. Consequently, on the actuator side, the same angle reading can represent for example two or more different joint positions brought about by two or more different turns of the actuator shaft, leading to difficulty in translating actuator data to actual position information.

To solve this problem, the gear unit further comprises a stop reference sensor, such as a Hall effect sensor, in a housing connected to the gear. In a Hall effect embodiment, one or more magnets is disposed in magnet slots providing a stop reference point on the external ring gear. As the ring gear rotates, the Hall effect sensor detect the magnet, and generates a signal transmitted to the controller. In system initialization, the ring gear can be positioned relative to the stop reference point, to provide a starting reference for interpreting, the differential angle of the actuator shaft.

In one implementation, the actuators 512 produce actuator state data consisting of angle information with ambiguity about a number of full rotations of a corresponding actuator, that caused a full range of motion of a corresponding link in the plurality of links in the kinematic chain, and respond to actuator command data to adjust actuator states. The gear units 702 are in communication with corresponding actuators 512. The gear units 702 are also connected to stop reference sensors configured to sense a traversal of the stop position of gears in the gear units and to communicate the number of rotations relative to a starting position of the gear to the controller to be combined with other sensor data for use in deriving, or directly as, feedback data in the control loop of the controller.

The controller is in communication with the actuators 512 to operate the kinematic chain to perform a task, and is configured to generate actuator command data in dependence on the actuator state data and the number of rotations to compensate for the ambiguity in the actuator state data. In some implementations, the stop sensors are attached to the gear units.

The technology disclosed can initialize the appendage with a preset appendage position, by adjusting the actuator to actuate the appendage to the stop position of the gears in the planetary gear unit. Motion of the actuator can be referenced by logic in the controller to the stop position to provide better information about the true position of the actuated joint. The technology disclosed then, in dependence on the stop position and the angle information, tracks the full range of motion of the appendage to a current appendage position caused by the one or more full rotations of the gears in the planetary gear unit, which information can be read by or provided to the controller to be combined with other sensor data for use in deriving, or directly as, feedback data in the control loop of the controller.

Tactile Sensors

Fingertips of the right hand 215 and the left hand 216 can in some embodiments include tactile sensors. The tactile sensors can comprise short range proximity sensor an infrared emitter and an infrared receiver/detector. The emitter and the receiver are embedded in a translucent silicone housing. In other embodiments, force sensitive resistor FSR technology can be used to sense actual pressure applied at the sensor on an object being manipulated. Other examples of the tactile sensors include GelSight sensors, strain gauge sensors, optical deflection sensors, and optical displacement sensors. The tactile sensors further comprise combinations of proximity sensors and pressure sensors that measure contact pressure between the fingertips and the object.

The object can be a target object that is manipulated by the robot 100 as part of a task.

In some implementations, the palms of the right hand 215 and the left hand 216 also include at least one tactile sensor, thereby generating additional proximity and pressure scalar outputs.

The proximity data, pressure data, temperature data and/or the touch data can be together considered tactile data.

In one implementation, a tactile sensor provides two scalar outputs: a proximity reading and a pressure reading. Accordingly, for the ten fingers, there are twenty scalar outputs that can be encoded as a two-dimensional vector. These outputs can be provided to or read by the controller during intervals of the feedback loop in the controller and used as feedback data or used to derive feedback data provided to the neural network that generates the actuator commands.

Visual Sensors

The right eye 202 and the left eye 203 are attached to the head 201. In some implementations, the right eye 202 and the left eye 203 share a common pan-tilt axes with the head 201. In other implementations, the right eye 202 and the left eye 203 have independent pan-tilt axis. In yet other implementations, the right eye 202 and the left eye 203 have independent pan axes but share a common tilt axis. In some implementations, the right eye 202 and the left eye 203 are mounted on a two DoFs pan-tilt platform (e.g., gimbal), enabling both smooth pursuit and saccadic camera motions. In addition, in some implementations, vergence (the simultaneous rotation of both the right eye 202 and the left eye 203 in opposite directions) may be adjustable, enabling changes to stereo vision of objects close to the robot 100. In other implementation, pointing directions of the eyes may be fixed, rather than actuated by the robot or camera controller.

The right eye 202 and the left eye 203 each have at least one visual sensor. In some embodiments each of the left and right eyes can include two image sensors, generating four streams of image data. In one implementation, the visual sensor is a stereoscopic depth sensor like the Intel® RealSense™ sensors (example models include the D435, the F200, the R200, the T265, the D435i IMU, the D415, and the L515). A particular Intel® RealSense™ sensor includes a color camera, two infrared cameras, and an infrared projector. The color camera is a Full HD (1920×1080 pixels), Bayer-patterned, rolling shutter CMOS imager. The field of view of the color camera is 70×43×77 (degrees; horizontal× vertical×diagonal). The infrared cameras have a spatial resolution of 640×480 pixels, a working depth range of 10-4000 mm, and a temporal resolution up to 60 Hz. The infrared cameras are identical, placed 70 mm apart, and feature 10 bit, global shutter VGA CMOS monochrome cameras with a visible cut filter to block light approximately below 840 mm. The field of view of the infrared cameras is 60×45×70 (degrees; horizontal×vertical×diagonal). The infrared projector is a texture projector with a fixed pattern.

In one implementation, the vertical field of view (VFoV) of the visual sensors of the right eye 202 and the left eye 203 is greater than their horizontal field of view (HFoV). That is, the aspect ratio of the visual sensors, which is defined as the HFoV divided by the VFoV is less than one. This is achieved by mounting the visual sensors in the head 201 such that they are rotated by ninety degrees and in a portrait orientation.

In some implementations, the visual sensor in the right eye 202 and the visual sensor in the left eye 203 have non-overlapping fields of view. In other implementations, they have overlapping fields of view. In one implementation, the fields of view of the visual sensors are extended by the neck 204 in the tilt and pan axes. In addition, using corresponding actuators in the actuation system 120, movement of the head 201 and, therefore the right eye 202 and the left eye 203, is controlled independently of the movement of other body parts of the robot 100.

The visual sensors generate image data and depth data in intervals of time, such as every milliseconds (50 frames a second). The image data from each eye can include three channels (red, green, blue) for each of the RGB sensors and a depth channel, which can be generated by RGB sensors, infrared sensors, LiDAR sensors, and RGB-D sensors. This image data indicates the position and orientation of the object and the end effectors (hands) for each interval of time, and can be provided as, or used to derive, feedback data for the controller.

Electronics Architecture

Figure 8A:
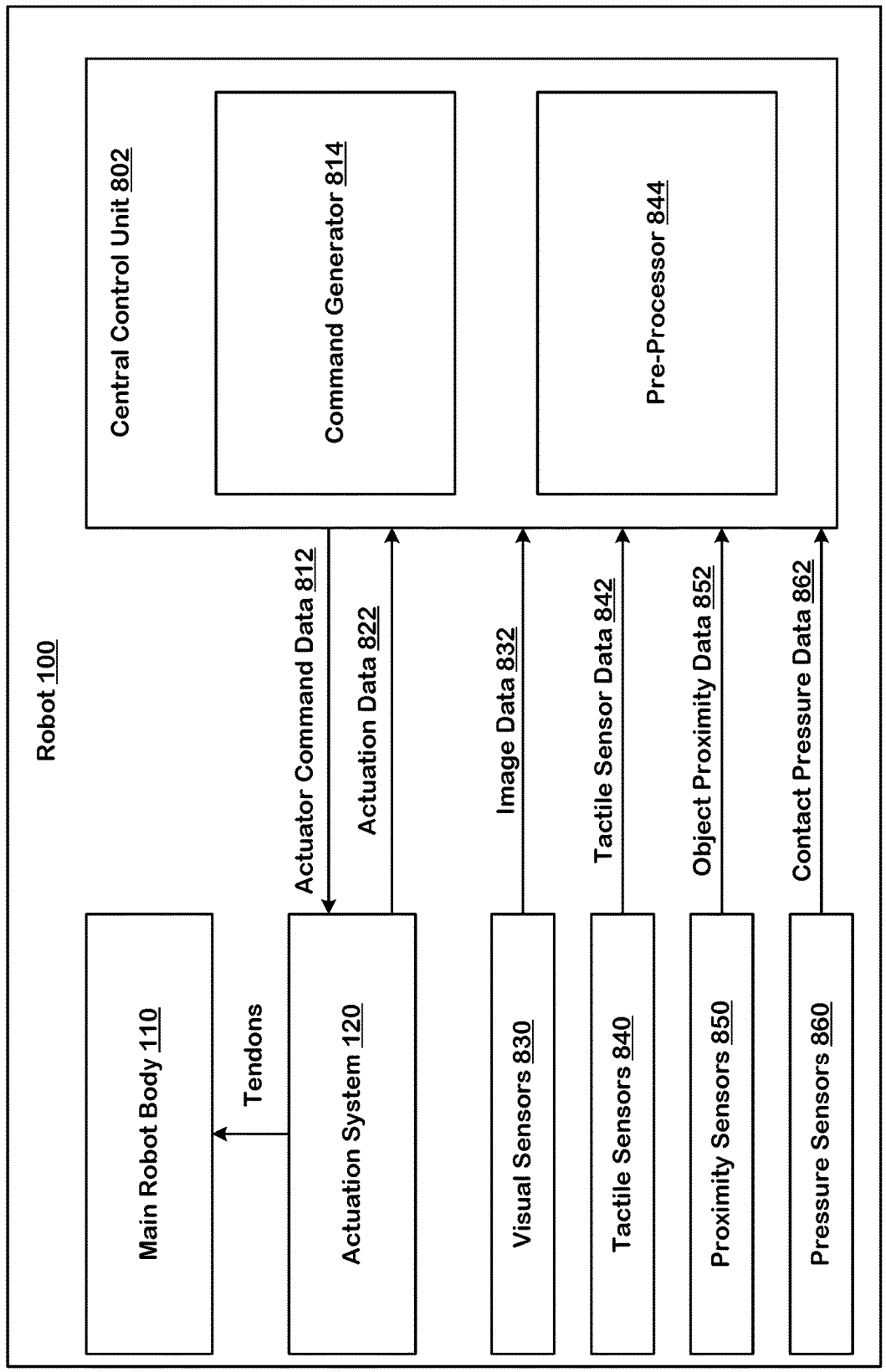
FIGS. 8A and 8B show implementation of an electronics architecture used by the robot in which a controller processes input data comprising at least actuation data from the actuators of the actuation system, image data from visual sensors in the robot, and tactile data from tactile sensors in the robot, and generates actuator command data.
Figure 8B:
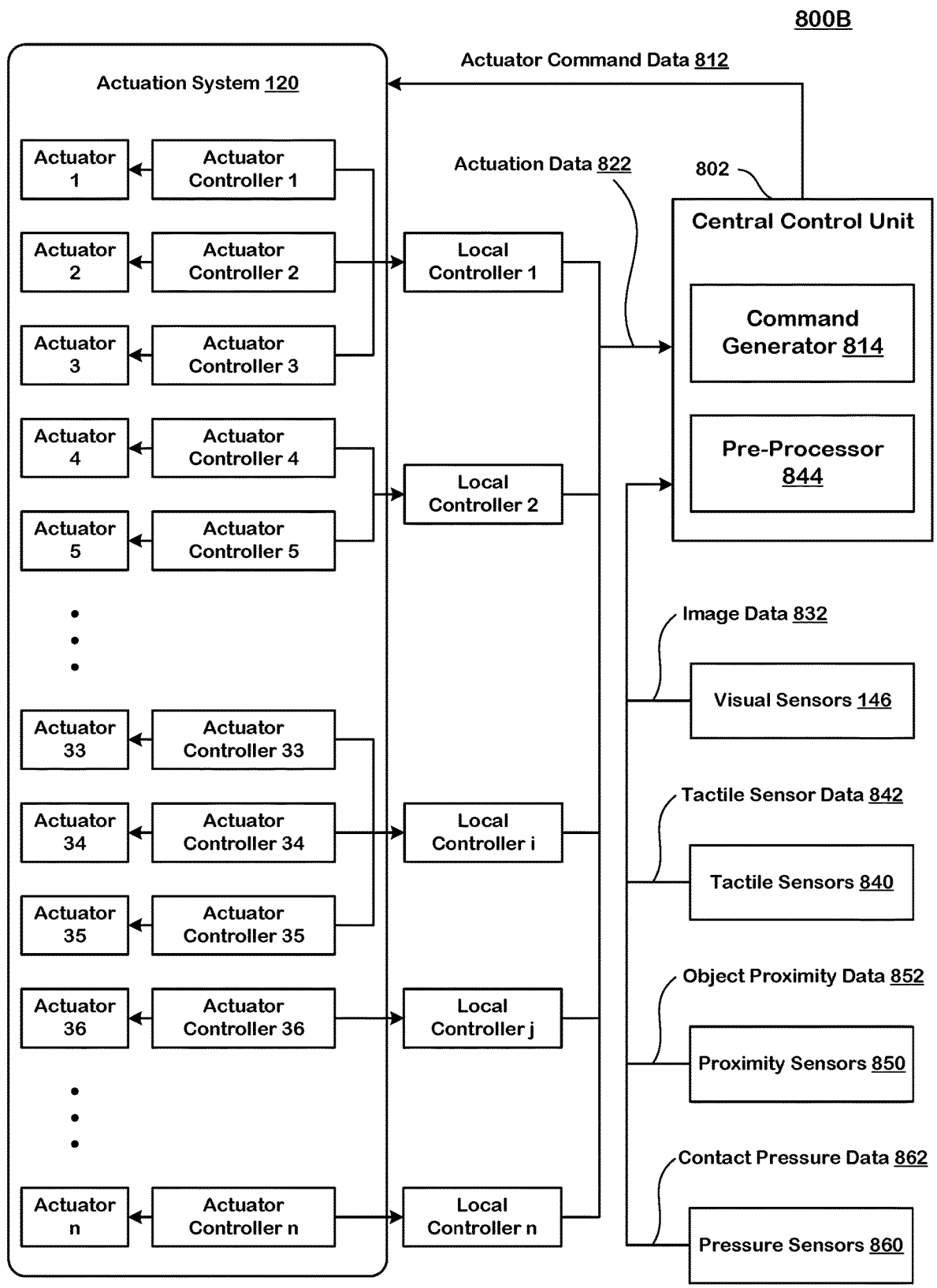

FIG. 8A shows one implementation of an electronics architecture 800A with a central control unit 802 that is used by the robot 100 to execute a control loop. FIG. 8B shows one implementation of an electronics architecture 800B with the central control unit 802 and some local controllers 1-n that are used by the robot 100 to execute the control loop.

FIG. 8A is a simple functional block diagram of the robot 100. The robot 100 includes main robot body 110, including the kinematic chain, and the actuation system 120. The robot 100 includes a central control unit 802 (i.e., controller) that in this example comprises a command generator 814 and a pre-processor 844. The controller is in communication with the plurality of actuators and the sensors, and operates the components on the kinematic chain. The controller includes a trained neural network in a feedback loop receiving feedback data derived from or including the actuator data and sensor data as feedback input, trained to generate actuator command data to cause the robot to execute a task to manipulate the object in response to the feedback data.

The actuation system 120 provides actuation data 822 to the central control unit 802, and receives actuator command data 812, including actuator commands, from the central control unit 802. Also, the robot 100 includes as described above, visual sensors 830 generating image data 832 and range data, tactile sensors 840 in this example generating tactile sensor data 842, proximity sensors 850 in this example generating object proximity data 852 relative to the end effectors, and pressure sensors 860 in this example generating contact pressure data 862. The actuation data 822, the image data 832, the tactile sensor data 842, the object proximity data 852, and the contact pressure data 862 are provided to the central control unit 802.

The pre-processor 844 can process the actuation data 822, the image data 832, the tactile sensor data 842, the object proximity data 852, and the contact pressure data 862 to produce a state vector for the robot 100. This state vector is produced in a manner that compensates for imprecision reflected in the raw data that is fed back from the actuators. In this sense, the feedback data includes this direct actuator data as well as the other sensor data, that is independent of the actuator data, and the resulting state vector can be more precise. The command generator 814 can generate a sequence of commands for the robot for the purposes of advancing the robot to complete a task with greater precision than if the pose of the robot were to be determined using only the actuator state information, due to this compensation for the imprecision of the tendon-driven joints and mechanisms. The pre-processor 844 can include one or more trained neural networks used for the purpose of deriving feedback data for input the neural network that generates the command data. Also, the command generator can include one or more trained neural networks. In some implementations, the command generator and the pre-processor comprise neural networks trained end-to-end using reinforcement learning. Other training procedures can be applied as well, including separate training of the neural networks in the controller.

Thus, the central control unit 802 processes input data comprising at least the actuation data 822 from the actuators 512 of the actuation system 120, the image data 832 from the visual sensors 830 in the head 201, and if present, other sensor data such as the tactile sensor data 842 from the tactile sensors 840 in the right hand 215 and the left hand 216, and generates actuator command data 812.

The electronics architecture 800A comprises the central control unit 802 that controls the actuators 512 and, therefore the tendons, the joints, the body parts, and the robot 100, using the command generator 814 and/or the pre-processor 844.

In some implementations, the electronics architecture 800B further comprises distributed local controllers that are responsible for low-level motor control, including current, velocity, and position control, evaluation of the joint sensors, output control signals to the actuator power electronics, parameterization of the actuator controllers, e.g., for gain scheduling, and data acquisition from the force/torque sensors and inertial measure measurement system. Each local controller can handle a set of actuators (e.g., one, two, or three actuators). Cable harnesses connect the actuator sensors, actuators, drives to the local controllers. The central control unit 802 and the local controllers can communicate by a high speed communication interface such as CAN, FireWire, or SERCOS, supporting real-time control in which each new set of actuator commands is based on feedback data that indicates the effects of the immediately preceding command set on the pose of the robot and the object of the task.

Controller

The central control unit 802 includes the command generator 814 and the pre-processor 844, in this example, implementing a control loop that includes processing the input data for an instant time interval, and generating the actuator command data 812 for use in a next time interval. The command generator 814 is a neural network system that can be trained using reinforcement learning algorithms and configured with a policy that implements the control feedback loop. The neural network system can use neural networks like a multi-layer perceptron (MLP), a feed-forward neural network (FFNN), a fully connected neural network (FCNN), a convolutional neural network (CNN), and a recurrent neural network (RNN). Example of the reinforcement learning algorithms include deterministic policy gradient algorithms, and policy-gradient actor-critic algorithms like deep deterministic policy gradient (DDPG) with hindsight experience replay (HER) and distributed distributional deterministic policy gradient (D4PG).

The central control unit 802 is also configured with a system file including a configuration file (e.g., configuration file 916 in FIG. 9) that specifies the task that is to be executed by the robot 100. The configuration file can identify the task in a sequence of sub-tasks, along with goal positions, goal angles, maximum and minimum values for sampling the goal positions and the goal angles, policy paths and trajectories, policy speedup coefficients, and feedback actions. Each "task" can be implemented using a set of weights generated by training the neural network system, including a trained neural network in a feedback loop receiving feedback data derived from or including the actuator data and the sensor data as feedback input, trained to generate actuator command data to cause the robot to execute the task to manipulate the object, or the robot in preparation for manipulation of an object, in response to the feedback data.

The input data 902 can include the range image data 832 from the visual sensors 146 in the head 201 indicating the orientation and position of the object and the end effectors in three dimensions and time, and the actuation data 822 from the actuators 512 of the actuation system 120. The input data 902 can further include the tactile sensor data 842 from the tactile sensors 840 in the right hand 215 and the left hand 216. The input data 902 can further include the object proximity data 852 from the proximity sensors 850. The input data 902 can further include the contact pressure data 862 from the pressure sensors 860. The input data 902 can further include external motion tracking data 932 from an external, stand-alone motion tracking system like Opti-Track™ that tracks motion of the robot 100 and the object in a three-dimensional space. The input data 902 can further include affirmation data 942 that conveys obedience of the robot 100 to a specified command. The input data 902 can be used as feedback data in the feedback loop, and can be used to derive feedback data, and both.

The actuator command data 812 updates one or more of the actuator parameters of the actuators 512. Examples of the actuator command data 812 include position updates, absolute positions, angle updates, absolute angles, torque updates, absolute torques, speed updates, absolute speeds, velocity updates, absolute velocities, acceleration updates, absolute accelerations, rotation updates, and absolute rotations. The actuator command data 812 is used to update the respective states of the actuators 512 in the next time interval, which in turn causes the tendons, the joints, the body parts, and the robot 100 to transition to a different state (e.g., tension, position, orientation) in the next time interval.

The actuator command data 812 can include commands for each of the actuators 512 or only a subset of the actuators 512. Each command can include an actuator ID, and a numerical value or values used to drive the actuator to a next state.

In the implementation listed above, the actuator command data 812 provided as output of the controller comprise a vector of drive changes for differential positioning, or a vector of position mode target positions, or a vector of force/torque values, and various combinations of differential mode commands, position mode command as suitable for the actuators under control.

The actuators 512 execute the commands specified in the actuator command data 812 and generate the actuation data 822 for the next time interval, and cause generation of the image data 832 by the visual sensors 830 and the tactile sensor data 842 by the tactile sensors 840 for the next time interval. The process is iterated by the control loop implemented by the controller 130.

In some implementations, the actuator command data 812 generated by the controller 130 is processed by a calibration module (not shown) that generates a calibrated version of the actuator command data 812 which is specific to the configuration of the robot 100. The calibrated version of the actuator command data is used to update the respective states of the actuators 512.

Pre-Processor

Figure 9:
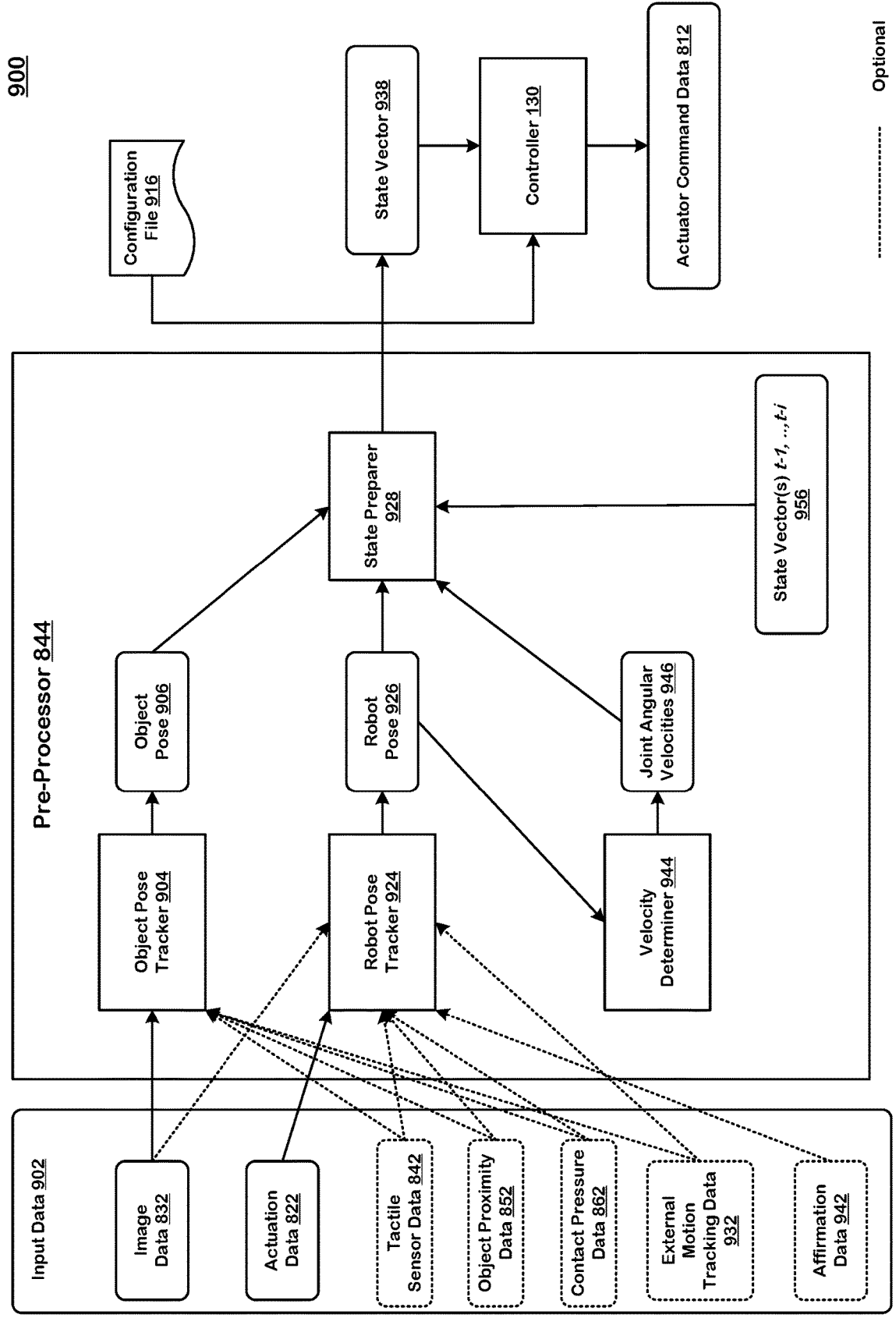
FIG. 9 shows one implementation of a pre-processor that first processes the input data and generates a state vector which is used by the controller to generate the actuator command data.

FIG. 9 shows one implementation of the pre-processor 844 that first processes the input data and provides feedback data in the form in this example of a state vector 938 which is used by the controller 130 to generate the actuator command data 812. The input data is first processed by the pre-processor 844, which using the data in turn to derive the state vector 938 that is then fed as feedback input to the controller 130. The controller 130 processes the state vector 938 for the instant time interval and generates the actuator command data 812 for use in the next time interval.

The pre-processor 844 includes logic modules implemented using computer software in a host computer system and neural network engines, such as GPUs or other neural network accelerator processors. Logic modules included can be characterized as an object pose tracker 904, a robot pose tracker 924, a velocity determiner 944, and a state preparer 928. The object pose tracker 904 and the robot pose tracker 924 can include linear regressors, exponential regressors, state vector machines, gradient boosted trees (XGBoost), or neural networks (e.g., MLPs, FFNNs, FCNNs, CNNs, RNNs).

The pre-processor 844 implements a pre-processing logic 900. The pre-processing logic 900 includes processing the image data 832 through the object pose tracker 904 and determining a pose (position and/or orientation) of the object, i.e., an object pose 906, including in some embodiments the pose of the robot or at least the pose of end effectors of the robot. In one implementation, the object pose tracker 904 uses a deep object pose estimate (DOPE)

algorithm and is trained to determine poses of the object and end effectors along multiple degrees of freedom, including object position and object orientation.

The pre-processing logic 900 also includes processing the actuation data 822 through the robot pose tracker 924 and determining a pose (position and/or orientation) of the robot 100, i.e., a robot pose 926 that compensates for precision errors in the actuation data 822 read from the actuators 512. In one implementation, the robot pose tracker 924 is trained to determine poses of the joints of the robot 100 along multiple degrees of freedom, including joint positions and joint angles. In some implementations, the image data 152 is also processed through the robot pose tracker 924 to generate the robot pose 926.

The following is an example of the robot pose 926 generated by the robot pose tracker 924 on a joint-by-joint basis using joint angles:

```
joint angles= {
    1. 'TWIST':
    2. 'WAIST_BEND':
    3. 'HEAD_TURN':
    4. 'HEAD_NOD':
    5. 'SHOULDER_ROT_R':
    6. 'SHOULDER_ADD_R':
    7. 'ARM_ADD_R':
    8. 'ELBOW_R':
    9. 'WRI_SUP_R':
    10. 'WRI_ADD_R':
    11. 'WRI_FLEX R':
    12. 'TH_ADD_R':
    13. 'TH_MCP_R':
    14. 'TH_IP_R':
    15. 'F1_MCP_R':
    16. 'F1_PIP_R':
    17. 'F1 _DIP_R':
    18. 'F2_MCP_R':
    19. 'F2_PIP_R':
    20. 'F2_DIP_R':
    21. 'F3_MCP_R':
    22. 'F3_PIP_R':
    23. 'F3_DIP_R':
    24. 'F4_MCP_R':
    25. 'F4_PIP_R':
    26. 'F4_DIP_R':
    27. 'SHOULDER_ROT_L':
    28. 'SHOULDER_ADD_L':
    29. 'ARM_ADD_L':
    30. 'ELBOW_L':
    31. 'WRI_SUP_L':
    32. 'WRI_ADD_L':
    33. 'WRI_FLEX_L':
    34. 'TH_ADD_L':
    35. 'TH_MCP_L':
    36. 'TH_IP_L':
    37. 'F1_MCP_L':
    38. 'F1_PIP L':
    39. 'F1_DIP_L':
    40. 'F2_MCP_L':
    41. 'F2_PIP_L':
    42. 'F2_DIP_L':
    43. 'F3_MCP_L':
    44. 'F3_PIP_L':
    45. 'F3_DIP_L':
    46. 'F4_MCP_L':
    47. 'F4_PIP_L':
    48. 'F4_DIP_L'
}
```

The pre-processing logic 900 also can include processing the robot pose 926 through the velocity determiner 944 to derive angular velocities of the joints of the robot 100, i.e., joint angular velocities 946 to be applied to the feedback loop in the controller.

The sensor data for the various sources can be received asynchronously at the controller for use to generate actuator command sets. The pre-processor accumulates the sensor data across an input interval to derive feedback data in a time aligned manner that indicates the results of a sequence of preceding command sets, including the immediately preceding command set, and used to produce a next command.

The pre-processing logic 900 also includes processing the object pose 906, the robot pose 926, the joint angular velocities 946, and one or more state vectors 956 from one or more previous time intervals through the state preparer 928 to time align the object pose 906, the robot pose 926, the joint angular velocities 946, and the one or more state vectors 956 and produce the state vector 938 that comprises time aligned feedback data as input to the neural network that generates the command data. In one implementation, the state preparer 928 uses linear interpolation for time alignment. The controller 130 processes the state vector 938 and generates the actuator command data 812.

In some implementations, the image data 152 jointly depicts both the object and the end effectors of the robot 100 (e.g., the right hand 215 and/or the left hand 216). In such implementations, the pre-processing logic 900 further includes processing the image data 152 through an object and robot tracker, which combines the functionality of the object pose tracker 904 and the robot pose tracker 924, and determining the object pose 906 and the robot pose 926.

In some implementations, the pre-processing logic 900 further includes processing sensor data from sensors on or off the kinematic chain including the tactile sensor data 842, the external motion tracking data 932, and the affirmation data 942 through the pre-processor 844, as depicted in FIG. 9.

As illustrated in FIG. 9, the control unit comprises a first neural network configured to process the actuator states in the previous time interval and generate intermediate robot pose data that indicates position and orientation information about the kinematic chain. Also, the controller includes a second neural network configured to process the images from the image sensor and generate intermediate object pose data that identifies position and orientation information about the object. Also, the controller includes joint velocity logic in communication with the first neural network, and is configured to determine joint velocity information for joints in the kinematic chain in dependence on the intermediate robot pose data. Also, the controller includes state vector logic in communication with the first neural network, the second neural network and the joint velocity logic, and generates a state vector in dependence on the robot pose data, the object pose data and the joint velocity information. Also, the controller includes a third neural network in communication with state vector logic and configured to generate the actuator command data for the instant time interval in dependence on the state vector. The first, second and third neural networks can be trained end-to-end using reinforcement learning. In some embodiments, the first, second and third neural networks can be trained separately.

Control Loop

Figure 10:
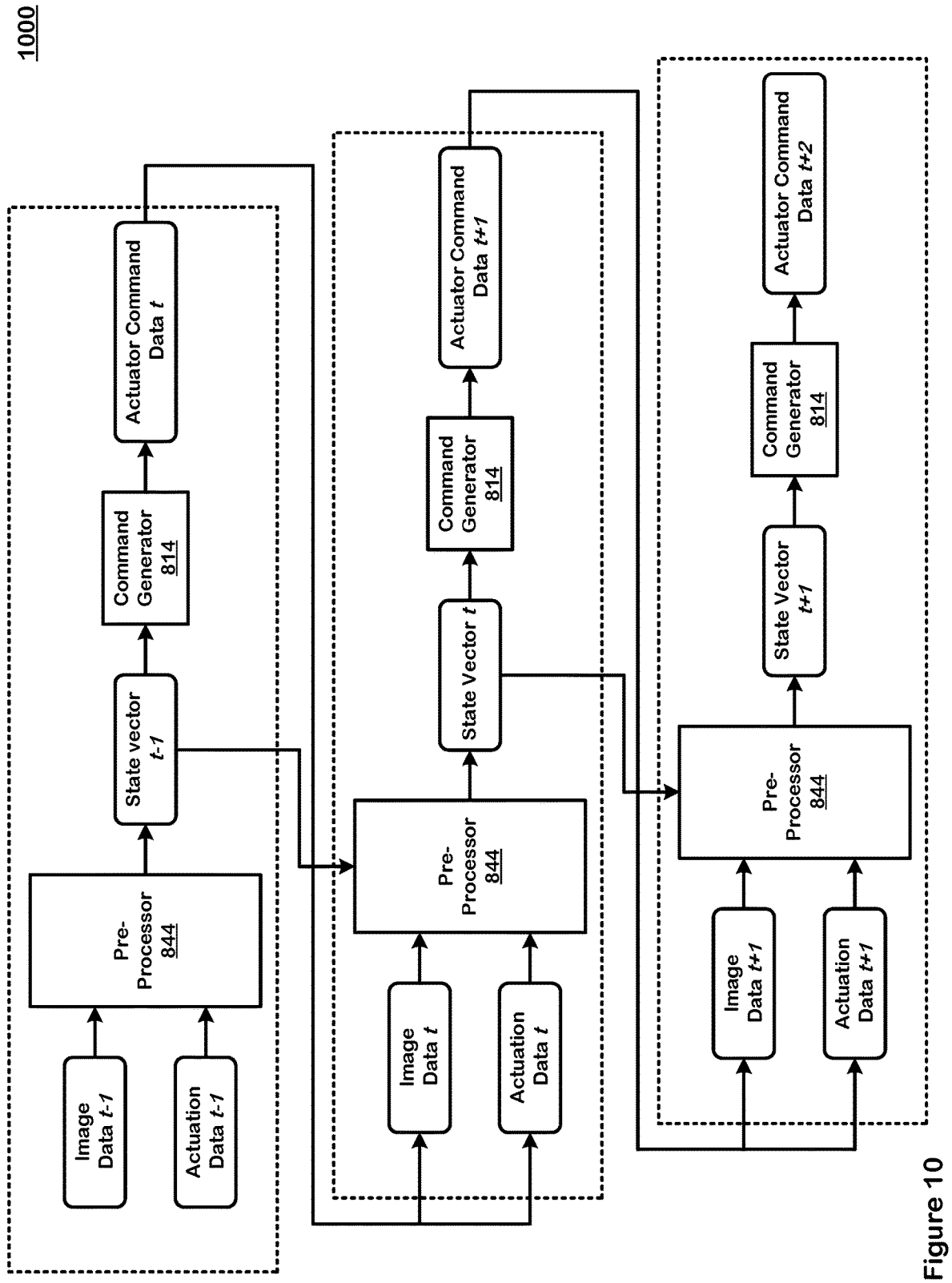
FIG. 10 illustrates one implementation of a control loop executed by the controller.

FIG. 10 illustrates one implementation of the control loop 1000 executed by the controller 130. In the previous time interval (t–1), the pre-processor 844 processes image data t–1 and actuation data t–1 (and other sensor data in some implementations) and generates a state vector t–1. The controller 130 processes the state vector t–1 and generates actuator command data t, for the current time interval. Then, the actuator command data tis used to update the respective states of the actuators 512, which in turn causes the joints of the robot 100 to change states, which in turn moves one or more body parts of the robot 100.

It is to be understood that the state vector for a prior time, such as t−1, may contain stored information from any prior time (for example t−2, t−3, etc.). Also, in each cycle, a one or more prior state vectors may be utilized as input to the control loop.

The actuator command data t causes the actuators 512 to move the head 201 of the robot 100, and one or more manipulators and/or end effectors of the robot 100 (e.g., the arms, hands, the fingers). The head 201 moves independently of the manipulators. The movement of the head 201 modifies a pose (position and/or orientation) of the visual sensors 146 of the robot 100. As a result, a field of view/an origin of the field of view/a line of sight of the visual sensors changes.

The process is repeated in the instant and next time intervals. The controller 130 processes sensor data and derives the state vector t and generates actuator command data t+1, for the next time interval. Then, the actuator command data t+1 is used to update the respective states of the actuators 512, which in turn causes the joints of the robot 100 to change states, which in turn moves one or more body parts of the robot 100. Continuing in the feedback loop, the controller 130 processes sensor data and derives the state vector t+1 and generates actuator command data t+2, for the next time interval. Then, the actuator command data t+2 is used to update the respective states of the actuators 512, which in turn causes the joints of the robot 100 to change states, which in turn moves one or more body parts of the robot 100, in order to execute a task that manipulates the object.

In general, a method for operating a robot including a kinematic chain having a plurality of tendon-driven joints and links is described. The method includes reading actuator state information from actuators configured to actuate tendons of the plurality of tendon-driven joints; reading images from an image sensor configured to generate images of a field of view including an object; and generating actuator command data in dependence on the actuator state information and images, and in some cases other sensor data, to operate the plurality of tendon-driven joints in the kinematic chain to perform a task, including compensating for imprecision of the tendons of the plurality of tendon-driven joints. The method can be adapted to configurations of the robot described herein.

Figure 11:
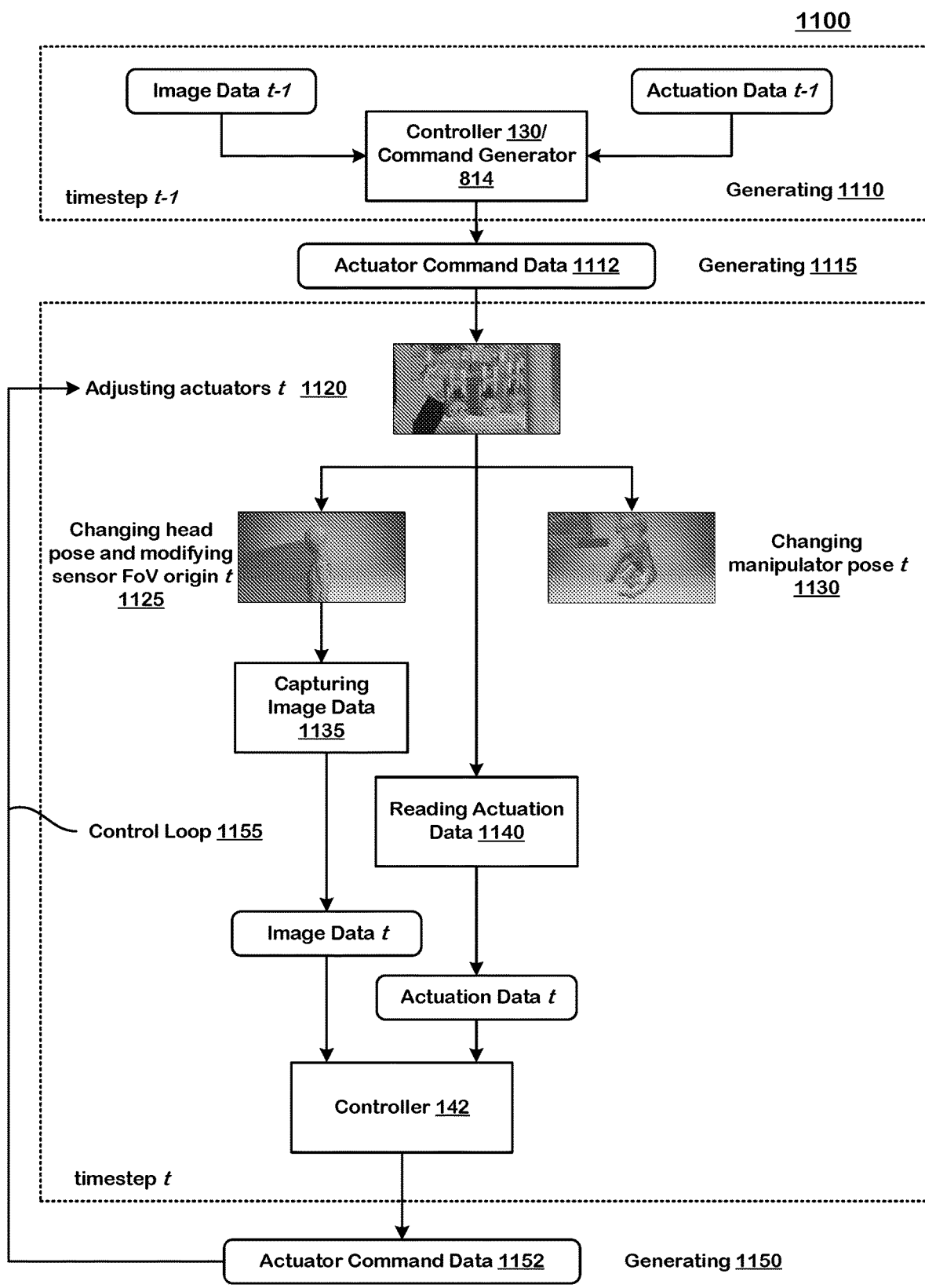
FIG. 11 depicts one implementation of operating a robot.

FIG. 11 depicts one implementation of operating a robot (e.g., robot 100) using process 1100 having an orientable head on which image sensors are mounted. The robot has a sensor branch (with a head) with visual and range sensors, and at least one manipulator branch. Process 1100 implements an example control loop 1155. Process 1100 includes accessing previous image and range sensor data t−1 generated 1110 in a previous time interval t−1, accessing previous sensor appendage actuation data t−1 generated 1110 in the previous time interval t−1 by one or more sensor appendage actuators that move the sensor appendage by actuating sensor appendage tendons during execution of the task, and accessing previous manipulator appendage actuation data t−1 generated in the previous time interval t−1 by one or more manipulator appendage actuators that move the manipulator appendage by actuating manipulator appendage tendons during execution of the task.

Process 1100 includes processing the previous image data t−1, the previous sensor appendage actuation data t−1, and the previous manipulator appendage actuation data t−1 and generating 1115 instant actuator command data 1112 for an instant time interval t that compensates for the precision errors in the previous sensor appendage actuation data t−1 and the previous manipulator appendage actuation data t−1.

Process 1100 includes adjusting 1120, based on the instant actuator command data 1112, the sensor appendage actuators to actuate the sensor appendage tendons to move the sensor appendage and thereby modify a pose of the visual sensors 1125, and adjusting 1120, based on the instant actuator command data 1112, the manipulator appendage actuators to actuate the manipulator appendage tendons to move the manipulator appendage and thereby modify a pose of the manipulator appendage 1130. Modifying the pose of the visual sensors includes modifying a position and/or an orientation of the visual sensors. In some implementations, modifying the position and/or the orientation of the visual sensors includes modifying fields of view of the visual sensors, including modifying origins of the fields of the view of the visual sensors and modifying lines of sight of the visual sensors. Modifying the pose of the manipulator appendage includes modifying a position and/or an orientation of the manipulator appendage.

Process 1100 includes generating or capturing 1135 instant image data in the instant time interval t using the modified pose of the visual sensors.

Process 1100 includes reading 1140 instant sensor appendage actuation data t in the instant time interval t from the adjusted sensor appendage actuators, the instant sensor appendage actuation data t having precision errors due to variability of the sensor appendage tendons, and reading 1140 instant manipulator appendage actuation data t in the instant time interval t from the adjusted manipulator appendage actuators, the instant manipulator appendage actuation data t having precision errors due to variability of the manipulator appendage tendons.

Process 1100 includes processing the instant image data t, the instant sensor appendage actuation data t, and the instant manipulator appendage actuation data t and generating 1150 in the controller next actuator command data 1152 for a next time interval t+1 that compensates for the precision errors in the instant sensor appendage actuation data t and the instant manipulator appendage actuation data t.

Process 1100 includes iterating the control loop 1155 until a task is performed.

Figure 12:
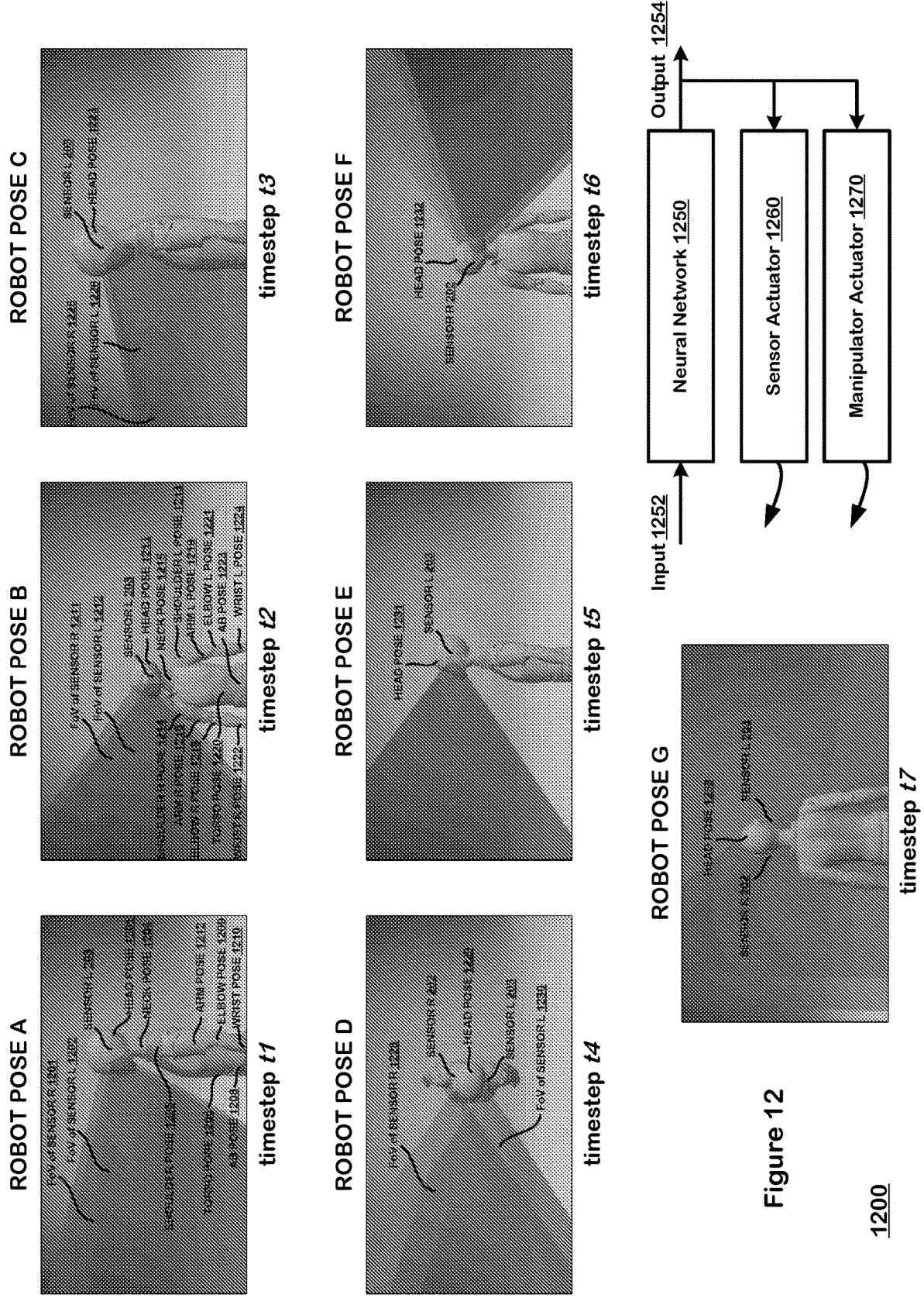
FIG. 12 shows one implementation of using a neural network to actuate sensor actuator and a manipulator actuator.

FIG. 12 shows one implementation of using a neural network 1250 to actuate 1200 a sensor actuator 1260 and a manipulator actuator 1270. The neural network 1250 processes an input 1252 and generates an output 1254. The sensor actuator 1260 modifies a field of view of a sensor (e.g., sensor R 202 and sensor L 203) based on the output 1254 and creates a modified field of view of the sensor (e.g., FoV 1201, 1202, 1211, 1212, 1225, 1226, 1228). The sensor then generates an image based on the modified field of view. The manipulator actuator 1270 modifies a pose of a manipulator based on the output 1254 and creates a modified pose of the manipulator (e.g., 1201, 1204, 1205, 1206, 1207, 1208, 1212, 1209, 1210-1232).

Figure 13:
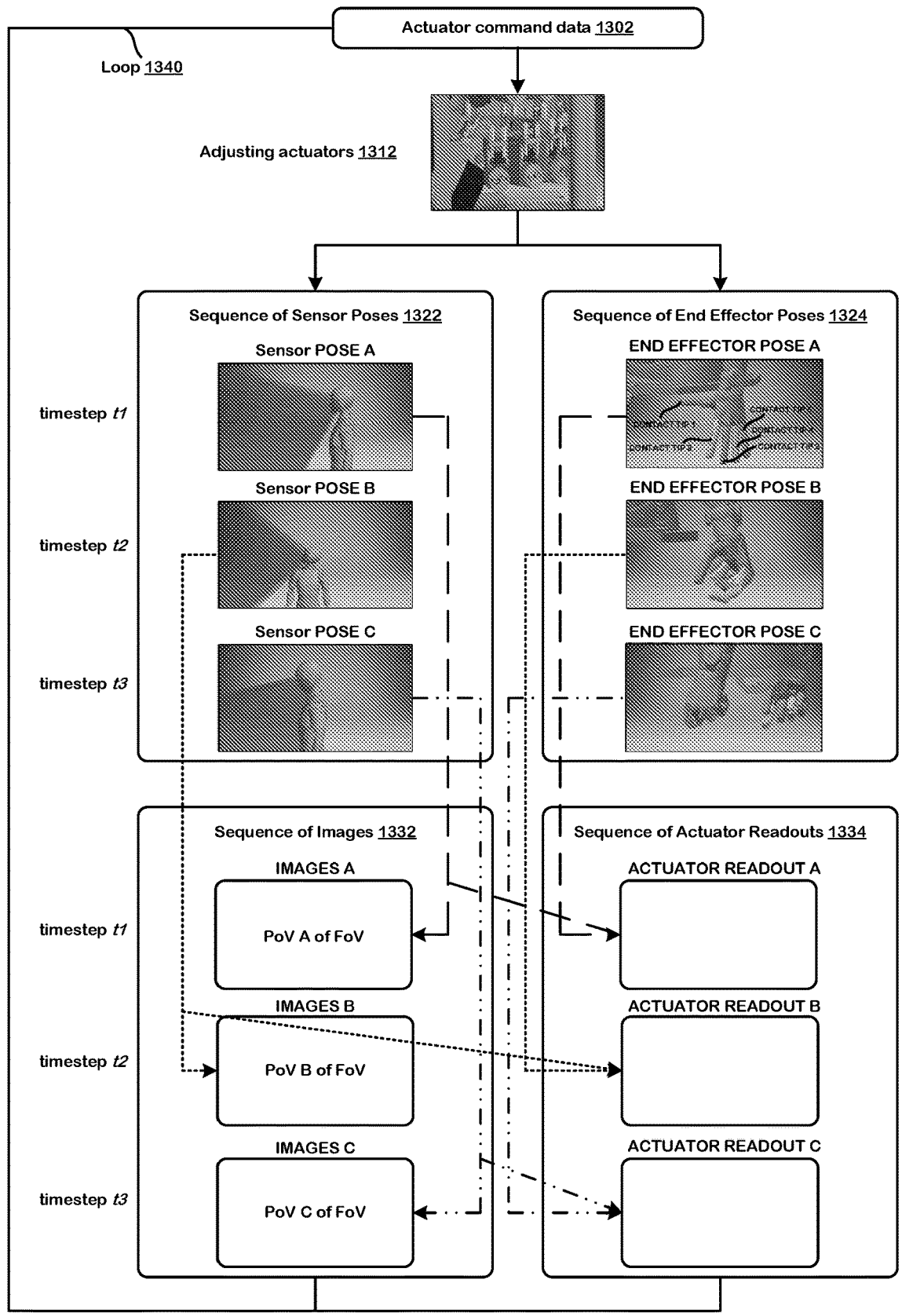
FIG. 13 illustrates one implementation of controlling a robot.

FIG. 13 illustrates one implementation of controlling a robot (e.g., robot 100). The robot includes an end effector (e.g., a hand) having contact tips (e.g., contact tips 1-5) for manipulating a target object during a task 1300. The robot also includes a sensor arm (e.g., head) having a sensor (e.g., camera) for generating images of a field of view corresponding to the task 1300.

Executing the task 1300 includes adjusting actuators 1312 for the sensor arm in response to actuator command data 1302 to place the sensor in a sequence of poses 1322. Executing the task 1330 further includes adjusting actuators 1312 for the contact tips in response to the actuator command data 1302 to place the contact tips in a sequence of poses 1324.

Executing the task 1300 includes generating images using the sensor at respective time intervals to provide a sequence of images 1332 having respective points of view of the field of view (e.g., images A, B, C), the sequence of images including an instant image for an instant time interval. Executing the task 1330 further includes receiving a sequence of actuation readouts 1334 from the adjusted actuators for the sensor arm and the contact tips, the sequence of actuation readouts including an instant actuation readout for the instant time interval.

Executing the task 1330 includes iteratively 1340 processing the instant image and the instant actuation readout to generate the actuator command data 1302 to cause the actuators to adjust the sensor and the contact tips in a next time interval.

Computer System

Figure 14:
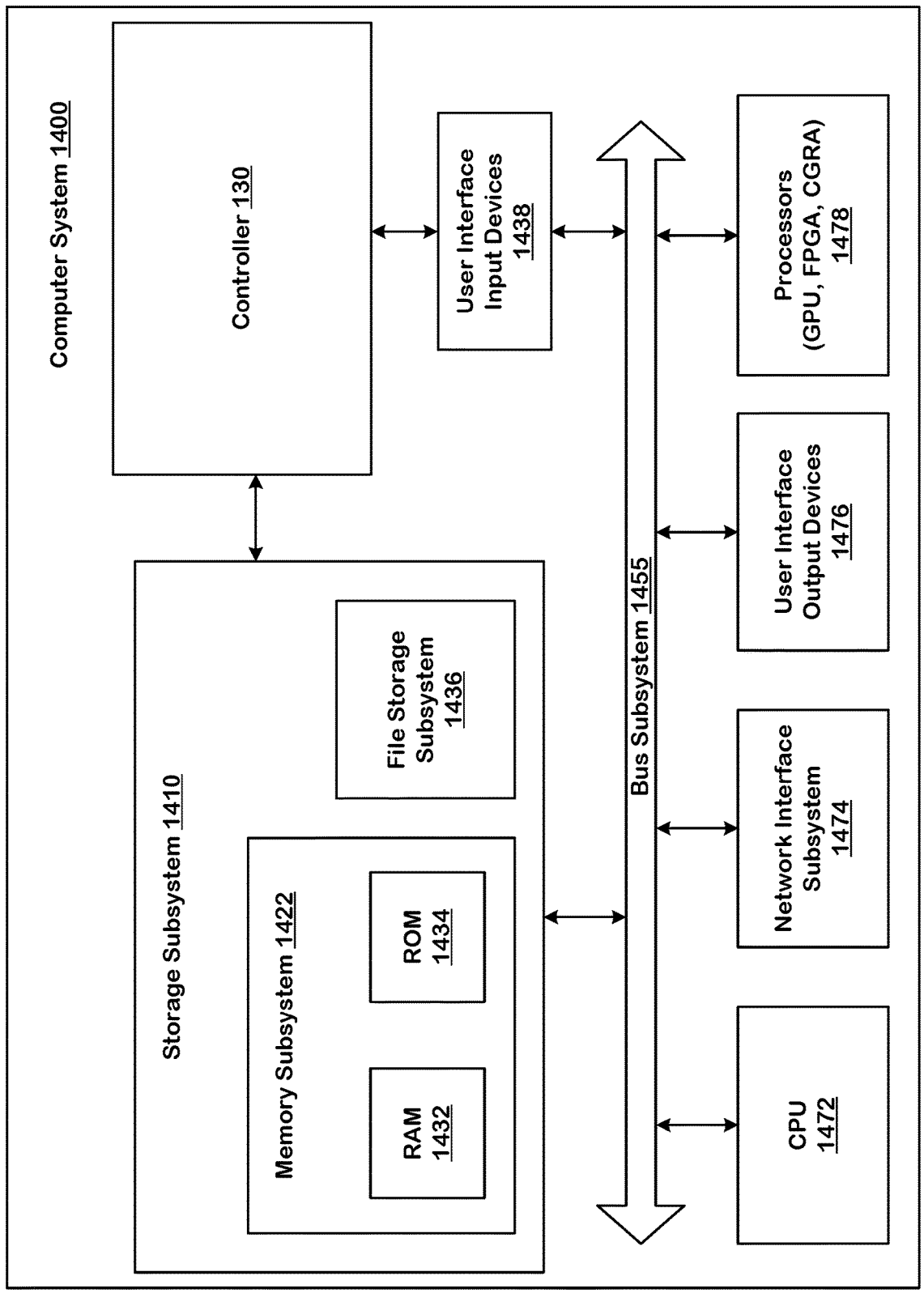
FIG. 14 is a computer system that can be used to implement the technology disclosed.

FIG. 14 is a computer system 1400 that can be used to implement the technology disclosed. Computer system 1400 includes at least one central processing unit (CPU) 1472 that communicates with a number of peripheral devices via bus subsystem 1455. These peripheral devices can include a storage subsystem 1410 including, for example, memory devices and a file storage subsystem 1436, user interface input devices 1438, user interface output devices 1476, and a network interface subsystem 1474. The input and output devices allow user interaction with computer system 1400. Network interface subsystem 1474 provides an interface to outside networks, including an interface to corresponding interface devices in other computer systems.

In one implementation, controller 130 is communicably linked to the storage subsystem 1410 and the user interface input devices 1438.

User interface input devices 1438 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1400.

User interface output devices 1476 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1400 to the user or to another machine or computer system.

Storage subsystem 1410 stores programming and data constructs that provide the functionality of some or all of the modules and methods described herein. These software modules are generally executed by processors 1478.

Processors 1478 can be graphics processing units (GPUs), field-programmable gate arrays (FPGAs), application-specific integrated circuits (ASICs), and/or coarse-grained reconfigurable architectures (CGRAs). Processors 1478 can be hosted by a deep learning cloud platform such as Google Cloud Platform™, Xilinx™, and Cirrascale™. Examples of processors 1478 include Google's Tensor Processing Unit (TPU)™, rackmount solutions like GX4 Rackmount Series™, GX14 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1422 used in the storage subsystem 1410 can include a number of memories including a main random access memory (RAM) 1432 for storage of instructions and data during program execution and a read only memory (ROM) 1434 in which fixed instructions are stored. A file storage subsystem 1436 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1436 in the storage subsystem 1410, or in other machines accessible by the processor.

Bus subsystem 1455 provides a mechanism for letting the various components and subsystems of computer system 1400 communicate with each other as intended. Although bus subsystem 1455 is shown schematically as a single bus, alternative implementations of the bus subsystem can use multiple busses.

Computer system 1400 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1400 depicted in FIG. 14 is intended only as a specific example for purposes of illustrating the preferred implementations of the present invention. Many other configurations of computer system 1400 are possible having more or less components than the computer system depicted in FIG. 14.

While the present invention is disclosed by reference to the preferred implementations and examples detailed above, it is to be understood that these examples are intended in an illustrative rather than in a limiting sense. It is contemplated that modifications, combinations, and alternative designs and implementations will readily occur to those skilled in the art, which modifications, combinations, and alternative designs and implementations will be within the spirit of the invention and the scope of the following claims.

The invention claimed is:

1. A robot, comprising:
    a robot structural frame;
    a kinematic chain comprising a plurality of joints and links, wherein the plurality of joints includes a root joint connected to the robot structural frame;
    a first end effector connected to the kinematic chain, wherein the first end effector is configured for grasping;
    an image sensor connected to the kinematic chain, wherein the image sensor is configured to generate images of a field of view;
    a plurality of actuators fixedly mounted on the structural frame or the kinematic chain and having positions and forces that are translated to corresponding actuation points on the kinematic chain, wherein the actuators produce actuator state data indicating current actuator states and respond to actuator command data to drive the actuators; and a controller in communication with the plurality of actuators to operate the kinematic chain to perform a task, wherein the controller is configured to generate the actuator command data based at least in part on the actuator state data and the images, wherein the controller includes a trained network that compensates for losses in precision in performance of the task due to variability in translating the positions and forces of the actuators to the corresponding actuation points on the kinematic chain.

2. The robot of claim 1, further comprising a plurality of tendons connected to the actuation points on the kinematic chain and to the actuators, wherein the plurality of tendons are arranged to translate the positions and forces of the actuators to the corresponding actuation points on the kinematic chain, wherein variability of the tendons causes the variability in translating the positions and forces of the actuators to the corresponding actuation points on the kinematic chain.

3. The robot of claim 2, wherein the first end effector is connected to a first branch of the kinematic chain, and wherein the image sensor is connected to a second branch of the kinematic chain that is different from the first branch of the kinematic chain.

4. The robot of claim 3, further comprising a second end effector connected to a third branch of the kinematic chain.

5. The robot of claim 2, wherein the actuators are positioned upstream of the root joint on the kinematic chain.

6. The robot of claim 5, wherein there are no actuators downstream of the root joint on the kinematic chain.

7. The robot of claim 2, further comprising a plurality of joint angle sensors disposed in the kinematic chain to generate joint angle sensor data, wherein the controller is configured to generate the actuator command data based on the actuator state data, the image data, and the joint angle sensor data.

8. The robot of claim 2, further comprising a plurality of tactile sensors disposed on the first end effector to generate tactile sensor data, wherein the controller is configured to generate the actuator command data based on the actuator states, the image data, and the tactile sensor data.

9. The robot of claim 2, further comprising a plurality of proximity sensors disposed on the first end effector to generate object proximity data, wherein the controller is configured to generate the actuator command data based on the actuator state data, the image data, and the object proximity data.

10. The robot of claim 1, further comprising a plurality of pressure sensors disposed on the first end effector to generate contact pressure data, wherein the controller is configured to generate the actuator command data based on the actuator state data, the image data, and the contact pressure data.

11. A robot, comprising:
a robot structural frame;
a kinematic chain including a root joint connected to the structure frame, the kinematic chain comprising a plurality of joints and links arranged downstream from the root joint and at least one end effector;
a plurality of actuators, wherein the actuators in the plurality of actuators produce actuator data indicating current actuator states and respond to actuator command data to drive the actuators;
a plurality of tendons connected to a corresponding plurality of actuation points on the kinematic chain and to actuators in the plurality of actuators, the plurality of tendons arranged to translate actuator position and force to actuation points on the kinematic chain, wherein actuators in the plurality of actuators positioned on the structural frame or on the kinematic chain upstream from respective actuation points in the plurality of actuation points;
a sensor configured to generate sensor data indicating in three dimensions and in time a position of the at least one end effector and of an object; and
a controller in communication with the plurality of actuators and the sensor to operate the kinematic chain and having access to memory storing a system file identifying a set of neural network topologies, neural network execution circuits, configurable to execute neural network topologies in the set, and to apply feedback data derived from or including the actuator data and the sensor data as input to the neural network execution circuits, the controller including a program to load and unload neural network topologies from the set according to a specified a task to manipulate the object in response to the feedback data.

12. A method of operating a robot, the method comprising:
reading actuator state data from a plurality of actuators having positions and forces that are translated to corresponding actuation points on a kinematic chain having a first branch connected to a first end effector;
generating sensor data indicating positions of an object and the first end effector;
generating feedback data from the actuator state data and the sensor data;
inputting the feedback data to a trained neural network to generate actuation command data to operate the kinematic chain to perform a task, wherein the actuation command data compensates for losses in precision in performance of the task due to variability in translating positions and forces of the actuators to corresponding actuation points on the kinematic chain; and
driving the plurality of actuators to operate the kinematic chain to perform the task based on the actuator command data.

13. The method of claim 12, wherein driving the plurality of actuators comprises translating the positions and forces of the actuators to the actuation points on the kinematic chain using a plurality of tendons connected to the actuation points and the actuators, and wherein the actuation command data compensates for losses in precision in performance of the task due to variability of the tendons.

14. The method of claim 12, wherein generating the sensor data indicating positions of the object and the first end effector comprises generating the sensor data using at least one first sensor connected to a second branch of the kinematic chain and at least one second sensor disposed on the first end effector.

15. The method of claim 12, wherein generating the sensor data indicating positions of the object and the first end effector comprises generating at least a portion of the sensor data using an image sensor connected to a second branch of the kinematic chain.

* * * * *